United States Patent
Hasama et al.

[11] Patent Number: 6,162,286
[45] Date of Patent: Dec. 19, 2000

[54] EXHAUST CLEANING SYSTEM

[75] Inventors: Norito Hasama; Emiko Hasama, both of Hanno, Japan

[73] Assignee: Kabushiki Kaisha Toteku Japan, Tokyo, Japan

[21] Appl. No.: 09/194,651

[22] PCT Filed: Apr. 17, 1997

[86] PCT No.: PCT/JP97/01326

§ 371 Date: Jan. 21, 1999

§ 102(e) Date: Jan. 21, 1999

[87] PCT Pub. No.: WO97/46302

PCT Pub. Date: Dec. 11, 1997

[30]     Foreign Application Priority Data

Jun. 1, 1996  [JP]  Japan ................................. 8-175390
Jul. 10, 1996 [JP]  Japan ................................. 8-214006
Jul. 24, 1996 [JP]  Japan ................................. 8-225788
Apr. 14, 1997 [JP]  Japan ................................. 9-96261

[51] Int. Cl.[7] .............................................. B01D 46/04
[52] U.S. Cl. ............................... 96/231; 95/281; 96/288
[58] Field of Search ..................... 95/212, 281; 96/230, 96/231, 233, 287, 288, 283, FOR 133; 55/354, DIG. 24, 524

[56]              References Cited

U.S. PATENT DOCUMENTS

| | | | |
|---|---|---|---|
| 700,858 | 5/1902 | Thomas | 96/288 |
| 1,749,594 | 3/1930 | Lyons | 96/288 |
| 1,836,131 | 12/1931 | Richter | 96/288 |
| 1,843,182 | 2/1932 | Strindberg | 96/231 |
| 1,941,524 | 1/1934 | Wittemeier et al. | 96/233 |
| 1,995,378 | 3/1935 | Dahlman | 96/288 |
| 2,403,261 | 7/1946 | Clark | 55/524 |
| 2,511,295 | 6/1950 | Roop | 96/288 |
| 2,920,718 | 1/1960 | Howell, Jr. et al. | 55/524 |
| 2,961,710 | 11/1960 | Stark | 55/524 |
| 3,238,056 | 3/1966 | Pall et al. | 55/524 |
| 3,252,691 | 5/1966 | Getzin et al. | 96/233 |
| 3,370,403 | 2/1968 | D'elia et al. | 96/288 |
| 3,487,620 | 1/1970 | Klein et al. | 96/231 |
| 3,717,978 | 2/1973 | Osborne, Jr. | 96/230 |
| 3,853,514 | 12/1974 | Post | 96/230 |
| 5,437,701 | 8/1995 | Townsley | 55/DIG. 24 |
| 5,573,811 | 11/1996 | Townsley | 55/DIG. 24 |
| 5,902,383 | 5/1999 | Hirose | 95/212 |
| 5,951,745 | 9/1999 | Gibbs et al. | 95/281 |

FOREIGN PATENT DOCUMENTS

| | | | |
|---|---|---|---|
| 1193776 | 11/1959 | France | 96/FOR 133 |
| 1047172 | 12/1958 | Germany | 96/FOR 133 |
| 3221288 | 12/1983 | Germany | 96/FOR 133 |
| 47-50702 | 12/1972 | Japan . | |
| 56-62512 | 5/1981 | Japan | 96/FOR 133 |
| 62-18252 | 5/1987 | Japan . | |
| 63-77513 | 4/1988 | Japan . | |
| 63-91117 | 4/1988 | Japan . | |
| 1-97136 | 6/1989 | Japan . | |
| 1-224025 | 9/1989 | Japan . | |
| 1-156721 | 10/1989 | Japan . | |
| 7-24423 | 5/1995 | Japan . | |

*Primary Examiner*—Duane S. Smith
*Attorney, Agent, or Firm*—Dennis G. LaPointe; Mason & Assoc., P.A.

[57]              ABSTRACT

A main body of exhaust cleaning system 15 is arranged in a hood 8 that is connected to an exhaust duct 14 at an upper part and is opened at a bottom face. A grease filter 23 is arranged at a side plate of a main body case 18 having an inlet 19 into which an exhaust air 5 flows. A filter 33 formed in an endless belt shape by gathering stainless steel wires and the like is attached to rotary shafts 25a, 25b provided to freely rotate in the main body case 18. The filter 33 adheres to the grease filter 23 and a discharge opening 10 through which the exhaust air 5 flows, and is partially immersed in a cleaning liquid 40 in a cleaning liquid tank 22 provided at a lower part of the main body case 18. The exhaust air 5 flowing from the inlet 19 through the grease filter 23 is flown through the rotationally moving filter 33, is flown again from a space 36 through the filter 33, and is discharged after being cleaned. A cleaning of the exhaust air 5 and a cleaning of the filter 33 can be done at a time.

26 Claims, 21 Drawing Sheets

EXHAUST CLEANING SYSTEM

TECHNICAL FIELD

The present invention relates to an exhaust cleaning system using a filter for clarifying and discharging an exhaust air containing contaminants generated from a restaurant, a home kitchen, combustion facilities, crushing facilities, etc..

BACKGROUND ART

Conventionally, as exhaust cleaning systems using filters for clarifying and discharging exhaust air containing oily steam and dust generated from the kitchens used at food supply facilities of hotels, restaurants, Tempura restaurants and Yakitori restaurants and home ventilation fans, and exhaust air containing contaminants generated from incineration facilities at waste incineration plants, crushing facilities of quarries and clinker calcination facilities of cement plants, various compositions are known. With regard to exhaust cleaning systems provided at kitchens, for example, compositions shown in FIGS. 20 and 21 are known.

A kitchen systems shown in FIGS. 20 and 21 employs a composition that an exhaust cleaning system 205 having a filter 204, such as a grease filter or a grease separator, for separating and removing tarry matters containing oil/grease and dust from an exhaust air 203 is arranged in a bellmouth-shaped hood 202 expanding downward that is connected to an exhaust duct 201, which is connected to the outdoors and stores a fan, and is arranged in a ceiling.

The filter 204 is, as provided by the Fire Service Law and various technical standards, formed with a stainless steel sheet, or a noncombustible material having a heat resistance and a corrosion resistance equal to or higher than those of the stainless steel sheet. In addition, the filter 204 is, as shown in FIG. 22 through 25, formed as a louver structure which a rapid directional conversion and contraction in air flow that occur when the exhaust air 203 flows through. And by a rapid directional conversion and contraction in air flow an oil/grease content in the exhaust air 203 touches a wall surface and an oil content exceeding a prescribed quantity is removed. Further, the filter 204 is arranged with a formation facilitating mounting/dismounting so that a deposited oil/grease can easily be washed off by separation. Underneath the filter 204, a trough 207 for collecting an oil/grease that flows through along an inner wall surface provided around a bottom part of the hood 202, and a trough 208 for collecting a prescribed quantity or more of the separated oil/grease and removing the same outside the hood 202 are provided. Additionally, the exhaust cleaning system 205 is arranged in the hood 202 such that a plain of the filter 204 is approximately 45 degrees tilted in conjunction with a horizontal plain so as to surely collect an oil/grease without causing dropping to a combustion system 210 and a fire source 211 in a kitchen.

Meantime, in the case of the exhaust cleaning system 205 having the filter 204 with the louver structure as shown in FIG. 22 through 25, an oil/grease content in the exhaust air 203, when it exceeds the prescribed quantity, flows out and is collected by troughs 207 and 208 arranged at the lower part. However, in the case of the filter 204 with the louver structure, when the exhaust air 203 contains a tar matter containing dust, the oil/grease content becomes stagnant due to an increase in viscosity, causing a decrease in flowability of the exhaust air 203 and in separation/removal efficiency. Also, as a noise, such as an air sound, is generated, a cleaning operation of the filter 204 using an alkali detergent must be done frequently particularly in an environment containing a lot of oil/grease. Further, an oil/grease content that is not removed and flows through the filter 204 deposits to an inner wall surface of the exhaust duct 201, degrading its exhaustibility, and the oil/grease deposited to the inner wall surface of the exhaust duct 201 adheres in a tar form due to a deposit of dust. Moreover, since this tar formed oil/grease requires a troublesome removal operation and involves a danger of ignition when it is oxidized, a troublesome cleaning operation of the exhaust duct 201 must be done. This increases a cleaning cost.

Also, when a fire prevention system, such as a fire damper or a fire extinguishing system having fire nozzles, is arranged in the exhaust duct 201, an oil/grease content that is not removed and flows through deposits and might hinder a fire extinguishing operation. Since maintenance is troublesome, a problem is an increase in maintenance cost.

To cope with this, conventionally, contaminants is separated and removed by spraying a cleaning detergent to a flowing exhaust air, contaminants depositing to the filter 204 is washed off by spraying a cleaning detergent to the filter 204, or a grease extractor providing an automatic cleaning function such as to separate and remove contaminants by flowing an exhaust air through a cleaning detergent or water is used.

However, in the case of a grease extractor providing an automatic cleaning function with a composition such that a cleaning liquid is sprayed or is blown to the filter 204, it is necessary to collect an effluent containing a washed oil/grease that flows through inside the exhaust duct 201 or nozzle for spraying or blowing without disturbing a flow of the exhaust air 203. The structures are complicated, making the production complicated and expensive and the system becomes a large scale. Further, in the case of a composition by which an exhaust air is flown through a cleaning liquid or water, it is necessary to take a long time for contact with a cleaning liquid or water to increase a removal rate, which poses a problem that a large air path resistance is generated and it is not possible to efficiently clean the exhaust air.

Also, because of a fixed composition to be attached to the hood 202, when cooking using oil is done at a center of a kitchen, for example, a collection rate of an evaporated oil/grease absorbed from the hood is extremely decreased, posing a problem of a degradation in a cooking environment.

Further, in a household environment containing an evaporated oil/grease a little, a problem is a difficulty to secure a space to arrange the hood 202 into which the exhaust cleaning system 205 is attached.

It is an object, therefore, of the present invention to provide an exhaust cleaning system of which a cleaning of a filter, that is soiled by cleaning exhaust air, is almost unnecessary and a maintenance is made easy: an exhaust cleaning system that can efficiently clean exhaust air; an exhaust cleaning system with a simple composition that can easily be produced; an exhaust cleaning system that can thoroughly clean particularly an exhaust air containing oil/grease; an exhaust cleaning system that can be moved as required by a style of use; and a compact exhaust cleaning system suitable for a use environment.

SUMMARY OF THE INVENTION

An exhaust cleaning system of the present invention is provided with a main body having an exhaust inlet into which an exhaust air flows and an exhaust outlet from which said exhaust air is discharged: a permeable filter, arranged in the main body, for passing said exhaust air that flows in from said exhaust inlet and discharging the same from said exhaust outlet; a cleaning means for cleaning at least a part of the filter with incombustible, and vegetable cleaning liquid; and a moving means for moving said filter to change a cleaning position of said filter to be cleaned by said cleaning means.

An exhaust air that flows from the exhaust inlet into the main body is separated and removed of contaminants in the exhaust air that are caught by the permeable filter while passing through the filter that is arranged in the main body and moved by the moving means, and since the contaminants caught by the filter are washed off when the filter is cleaned with an incombustible, vegetable cleaning liquid at least partially by its cleaning position being changed by the moving means.

Therefore, an exhaust air that flows from the exhaust inlet into the main body is separated and removed of contaminants in the exhaust air that are caught by the permeable filter while passing through the filter that is arranged in the main body and moved by the moving means, and since the contaminants caught by the filter are washed off when the filter is cleaned with an incombustible, vegetable cleaning liquid of cleaning means being changed by the moving means, cleaning operation are nearly automated, the exhaust air is efficiently cleaned and maintenance is made easy and it is easy to handle easily to treat cleaning liquid containing pollutants that have been removed from exhaust air, and can be used in an atmosphere receiving a heat load.

Furthermore, the invention has a main body having an exhaust inlet to which exhaust air of said invention flows in and an exhaust outlet from which said exhaust air is discharged, a permeable filter is fitted to the main body and from which said exhaust air flown in through said exhaust inlet is flown out, a cleaning mean to clean at least a part of the filters by using a cleaning liquid containing a main component of amine soap made from tallol as a material and a higher alcoholic nonionic surfactant, and moving means to change the position of cleaning—by said cleaning means— of said filters by moving said filters. Next, pollutants contained in exhaust air is caught with the filters to separate and remove, when the exhaust air flew in the main body from the exhaust inlet flows through permeable filters, that is fitted inside the main body and moved by moving mean, is discharged from the exhaust outlet of the main body. In addition, pollutants caught with the filters are cleaned by cleaning means with a cleaning liquid containing amine soap as the main component made from tallol as the material and a higher alcoholic nonionic surfactant with a change of cleaning position of at least a part of filters by moving means. Therefore, exhaust air flew in the main body through the exhaust inlet flows through moving porous filters in the main body and is discharged from the exhaust outlet of the main body to catch pollutants contained in the exhaust air with the filters followed by separation and removal. The pollutants caught with the filters are cleaned by cleaning means with a cleaning liquid containing amine soap as the main component made from tallol as the material and a higher alcoholic nonionic surfactant with a change of the position of filters movable by moving means. Thus, cleaning work can be automated to make cleaning of the exhaust air efficiently, maintenance and management can be easily done, easy treatment, incombustibility, easy handling, and a higher cleaning performance can be realized, and the exhaust air can be cleaned well, efficiently, and stably for along time. Furthermore, an exaust, an exhaust cleaning system of the present invention is an exhaust cleaning system as claimed in the above invention, wherein the cleaning means has a cleaning liquid and provided with an injection unit for injection said cleaning liquid to a part of the filter.

And cleaning is done by injecting the cleaning liquid to the filter by the injection unit of the cleaning means.

Therefore, since cleaning is done by injecting the cleaning liquid to the filter by the injection unit of the cleaning means, automation is possible with a simple composition and filter cleaning can be done easily.

Further, an exhaust cleaning system of the present invention is provided with a main body having an exhaust inlet into which an exhaust air flows and an exhaust outlet from which said exhaust air is discharged; a permeable filter arranged in the main body and covering said exhaust outlet; a cleaning means for storing an incombustible, vegetable cleaning liquid in which at least a part of the filter is immersed:: and a moving means for moving said filter to change a cleaning position of said filter to be cleaned by said cleaning means.

And an exhaust air that flows from the exhaust inlet into the main body is separated and removed of contaminants in the exhaust air that are caught while passing through the permeable filter that is arranged in the main body and moved by the moving means, and the filter is moved by the moving means and is immersed at least partially in the incombustible, vegetable cleaning liquid of the cleaning means by its position being changed to wash off contaminants caught.

Therefore, since an exhaust air that flows from the exhaust inlet into the main body is separated and removed of contaminants in the exhaust air that are caught while passing through the permeable filter that is arranged in the main body and moved by the moving means, and the filter is moved by the moving means and is immersed at least partially in the incombustible, vegetable cleaning liquid of the cleaning means by its position being changed to wash off contaminants caught, cleaning operations are nearly automated, the exhaust air is efficiently cleaned, and maintenance is made easy and it is easy to handle easily to treat cleaning liquid containing pollutants that have been removed from exhaust air, and can be used in an atmosphere receiving a heat load.

In addition, the invention has a main body having an exhaust inlet to which exhaust air of said invention flows in and an exhaust outlet from which said exhaust air is discharged, permeable filters fitted to the main body cover said exhaust outlet, a cleaning mean to store a cleaning liquid containing a main component of amine soap made from tallol as a material and a higher alcoholic nonionic surfactant and to immerse at least a part of the filters, and moving means to change the position of cleaning—by said cleaning means—of said filters by moving said filters. Next, pollutants contained in exhaust air is caught with the filters to separate and remove, when the exhaust air flown in the main body through the exhaust inlet flows through permeable filters, that is fitted inside the main body and moved by moving means, is discharged from the exhaust outlet of the main body. In addition, the filters movable by moving means clean away the pollutants, that have been caught, are ommersed in a cleaning liquid of cleaning means containing amine soap as the main component made from tallol as the material and a higher alcoholic nonionic surfactant with a change of the position of at least a part of the filters. Therefore, exhaust air flew in the main body through the exhaust inlet flows through moving porous filters in the main body and is discharged from the exhaust outlet of the main body to catch pollutants contained in the exhaust air with the filters followed by separation and removal. The filters are moved by moving means to clean away the pollutants, that have been caught, by immersing in an incombustible, vegetable, cleaning liquid of cleaning means with a change of the position of at least a part of the filters. Thus, cleaning work can be almost automated to make cleaning of the exhaust air efficiently, maintenance and management can be easily done, easy treatment, incombustibility, easy handling, and a higher cleaning performance can be realized, and the exhaust air can be cleaned well, efficiently, and stably for a long time. Furthermore, an exhaust cleaning system of the present invention is an exhaust cleaning system according to the above invention, wherein since the moving means is intended to move the filter while covering the exhaust outlet and the filter is moved while covering the exhaust outlet.

And the filter is moved while covering the exhaust outlet by the moving means.

Therefore, since the filter is moved while covering the exhaust outlet by the moving means, it is possible to prevent a harmful effect, such as clogging, due to contaminants in the exhaust air being caught by the same surface, and since composition is simplified, filter cleaning is made easy and a catching of contaminants in the exhaust air and filter cleaning can be done at a time, both a cleaning efficiency of the exhaust air and that of the filter are improved.

Furthermore, an exhaust cleaning system of the present invention is an exhaust cleaning system according to the above invention, wherein the exhaust air is to be flown through the filter at least twice.

And the exhaust air is to be flown through the filter at least twice.

Therefore, since the exhaust air is flown through the filter at least twice, a removal rate of contaminants in the exhaust air is improved and it is able to clean the exhaust satisfactory.

Furthermore an exhaust cleaning system of the present invention is an exhaust cleaning system as claimed in the above invention, wherein the filter is formed as an endless belt.

And the filter is formed as an endless belt.

Therefore, since the filter is formed as an endless belt, a freedom of filter arrangement is increased, productivity is improved, and a compact design is easily applicable.

And an exhaust cleaning system of the present invention is an exhaust cleaning system according to the above invention, wherein the moving means is intended to rotationally move the filter.

Further, the invention has filters—of said invention—that has been formed in a near cylindrical shape having an inside space.

The filters are made to have a near cylindrical shape with an inside space. Thus, the filters made to have a near cylindrical shape with an inside space allow easy cleaning of the filters efficiently and simplification of the structure of the cleaning means and also easily allow the structure to improve cleaning efficiency by flowing exhaust air through the filters in plural frequencies. Further, in the invention, the moving means of said invention have a filter holding part to hold filters and driving means to move the filter holding part.

The filter holding part is moved by driving means. Therefore, The filter holding part holding filters and movable by moving means allows to move easily the filters keeping shape, prevent a damage of filters caused by a load in moving, and clean the exhaust air efficiently for a long time.

Furthermore, the moving means is intended to rotationally move the filter.

Therefore, since the filter is moved rotationally by the moving means, a space required for moving the filter is small, and a compact design is easily applicable.

An exhaust cleaning system of the present invention is an exhaust cleaning system according to the above invention, wherein the moving means is provided with a frame-shaped filter holding part for holding the filter and a driving means for rotationally moving the filter holding part.

And the frame-shaped filter holding part holding the filter is rotationally moved by the driving means.

Therefore, since the frame-shaped filter holding part holding the filter is rotationally moved by the driving means, a space required for moving the filter is small and a compact design is applicable, filter can easily be moved while maintaining its shape as is, thereby preventing a damage of the filter due to a load during movement, filter mounting/dismounting is made easy, productivity is improved, and maintenance is made easy.

Furthermore, in the invention the cleaning means of said invention has ultrasonic cleaning means to clean ultrasonically the filters, that is immersed in cleaning liquid. The filters immersed in cleaning liquid are ultrasonically cleaned by ultrasonic cleaning means. Thus, the ultrasonic cleaning of the filters immersed in the cleaning liquid by ultrasonic cleaning means allows to improve cleaning performance and clean the exhaust air efficiently for a long time. Furthermore, the present invention. Furthermore, the invention" of the line 3 of the page 7 of specification to "Furthermore in the invention the cleaning means of said invention has ultrasonic cleaning means to clean ultrasonically the filters, that is immersed in cleaning liquid. The filters immersed in cleaning liquid are ultrasonically cleaned by ultrasonic cleaning means. Thus, the ultrasonic cleaning of the filters immersed in the cleaning liquid by ultrasonic cleaning means allows to improve cleaning performance and clean the exhaust air efficiently for a long time.

Furthermore, the present invention is provided with a main body having an exhaust inlet into which an exhaust air flows and an exhaust outlet from which said exhaust air is discharged; a permeable filter, arranged in the main body, for passing said exhaust air that flows in from said exhaust inlet and discharging the same from said exhaust outlet; a cleaning means having an injection unit for injecting an incombustible, vegetable, cleaning liquid to the filter and cleaning at least a part of the filter; and a moving means for moving said injection unit of the cleaning means to change a cleaning position of said filter.

And an exhaust air that flows from the exhaust inlet into the main body is separated and removed of contaminants in the exhaust air that are caught by the permeable filter while passing through the filter that is arranged in the main body and moved by the moving means. Furthermore, since the contaminants caught by the filter are washed off when the filter is cleaned by its cleaning position being changed by the injection unit of the cleaning means that injects the incombustible, vegetable, cleaning liquid to the filter and is moved by the moving means.

Therefore, since an exhaust air that flows from the exhaust inlet into the main body is separated and removed of contaminants in the exhaust air that are caught by the permeable filter while removed of contaminants in the exhaust air that are caught by the permeable filter while passing through the filter that is arranged in the main body and moved by the moving means and the contaminants caught by the filter are washed off when the filter is cleaned by its cleaning position being changed by the injection unit of the cleaning means cleaned by its cleaning position being changed by the injection unit of the cleaning means that injects the cleaning liquid to the contaminants by the moving means, cleaning operations are nearly automated, the exhaust air is efficiently cleaned, and maintenance is made easy and it is easy to handle easily to treat cleaning liquid containing pollutants that have been removed from exhaust air, and can be used in an atmosphere receiving a heat load.

Besides, the invention has a main body having an exhaust inlet to which exhaust air of said invention flows in and an exhaust outlet from which said exhaust air is discharged through permeable filters fitted to the main body to flow out said exhaust air, that flew in from said exhaust inlet, by flowing through said exhaust outlet, cleaning means having an injection unit to clean said filters by injecting a cleaning liquid—containing a main component of amine soap made from tallol as a material and a higher alcoholic nonionic surfactant—to at least a part of the filters, and moving means to change the position of cleaning of said filters by moving said injection unit of the cleaning means. Next, pollutants contained in exhaust air is caught with the filters to separate and remove, when the exhaust air flew in the main body through the exhaust inlet flows through permeable filters— fitted inside the main body—discharges from the exhaust outlet of the main body. In addition, the pollutants—caught by the filters—are cleaned away by cleaning by changing a cleaning position of the filters by moving the injection unit of cleaning means to inject a cleaning liquid to the filters— containing amine soap as the main component made from tallol as the material and a higher alcoholic nonionic surfactant—by moving means with a change of the cleaning position of the filters. Therefore, the exhaust air flew in the main body through the exhaust inlet flows through porous filters in the main body and is discharged from the exhaust outlet of the main body to catch pollutants contained in the exhaust air with the filters followed by separation and removal. Pollutants caught by the filters are cleaned away by changing the position of the injection unit of the injecting means to inject the cleaning liquid—containing amine soap as the main component made from tallol as the material and a higher alcoholic nonionic surfactant—to the filters by moving means. Thus, cleaning work can be almost automated to make cleaning of the exhaust air efficiently, maintenance and management can be easily done, easy treatment, incombustibility, easy handling, and a higher cleaning performance can be realized, and the exhaust air can be cleaned well, efficiently, and stably for a long time. On the other hand, in the invention the injection unit of said invention injects the cleaning liquid from the upper side of flowing direction of the exhaust air to the filters. Next, cleaning is carried out by injecting the cleaning liquid from the upper side of flowing direction of the exhaust air to the filters in the injection unit. Therefore, cleaning carried out by injecting the cleaning liquid from the upper side of flowing direction of the exhaust air to the filters in the injection unit allows to clean efficiently the filters easily preventing injecting the cleaning liquid to the outside, easily collect an injected cleaning liquid and the cleaning liquid contaminated by pollutants to make the structure simple. Further, in the invention, the cleaning liquid of said invention is incombustible, and vegetable. Incombustible, and vegetable cleaning liquid is used. Thus, the use of incombustible, and vegetable cleaning liquid allows to handle it easily, treat easily the cleaning liquid contaminated by pollutants removed from the exhaust air, and use it in an atmosphere receiving a heat load. In addition, in the invention, the cleaning liquid of said invention contains amine soap as the main component made from tallol as the material and a higher alcoholic nonionic surfactant. The cleaning liquid of said invention containing amine soap as the main component made from tallol as the material and a higher alcoholic nonionic surfactant is used. Thus, the use of the cleaning liquid of said invention containing amine soap as the main component made from tallol as the material and a higher alcoholic nonionic surfactant allows to yield easy treatment, incombustibility, easy handling, and the higher cleaning performance and clean the exhaust air well efficiently and stably for a long time.

Furthermore, an exhaust cleaning system of the present invention is an exhaust cleaning system according to the above invention, wherein the filter has an incombustibility or a noncombustibility and a corrosion resistance.

And the filter is formed incombustible or noncombustible.

Therefore, since the filter is formed incombustible or noncombustible and corrosion resistant, the filter is not deteriorated by cleaning using the cleaning liquid and can be used even under an atmosphere in which it is subject to a heat load and the cleaning efficiency of the exhaust air is stable in a long period.

On the other hand, an exhaust cleaning system of the present invention is an exhaust cleaning system according to the above invention, wherein the filter is formed with at least either of gathered slender metal. wires or gathered slender thin metal sheets.

And at least either of gathered slender metal wires or gathered slender metal thin sheet form the filter.

Therefore, since at least either of gathered slender metal wires or gathered slender metal thin sheets form the filter, softness, noncombustibility, corrosion resistance and a high strength can easily be obtained, production is made easy and productivity is improved, and a low price is possible and the cleaning efficiency of the exhaust air is stable in a long period.

An exhaust cleaning system of the present invention is an exhaust cleaning system according to the above invention, wherein the filter is formed with stainless steel.

And the filter is formed with stainless steel.

Therefore, since the filter is formed with stainless steel, noncombustibility, a high corrosion resistance and a high strength can easily be obtained and the cleaning efficiency of the exhaust air is stable in a long period.

Furthermore, an exhaust cleaning system of the present is an exhaust cleaning system according to the above invention, wherein the main body has a leg part that mounts the main body to move on a floor surface.

And the main body has a leg part that mounts the main body to move on a floor surface.

Therefore, since the main body is provided with the leg part that mounts the main body to move on a floor surface, an exhaust air can be cleaned efficiently by moving the main body while coping with a condition the exhaust air is generated.

An exhaust cleaning system of the present invention is an exhaust cleaning system according to the above invention, wherein the cleaning means is provided with a cleaning liquid supply/discharge means for supplying and discharging a cleaning liquid.

And the cleaning means is provided with a cleaning liquid supply/discharge means for supplying and discharging a cleaning liquid.

Therefore, since the cleaning means is provided with a cleaning liquid supply/discharge means for supplying and discharging a cleaning liquid, a supply to the cleaning means and a discharge of the cleaning liquid is performed efficiently by the cleaning liquid supply/discharge means, without soiling other parts.

Further, an exhaust cleaning system of the present invention is an exhaust cleaning system according to the above invention, wherein the filter is covered with a flow restricting body having flow holes that do not allow a linear flow of an exhaust air.

And the filter is covered with the flow restricting body having flow holes that do not allow the linear flow of the exhaust air.

Therefore, and since the filter is covered with the flow restricting body having flow holes that do not allow the linear flow of the exhaust air and the exhaust air is cleaned while flowing through the filter after flowing through the flow holes of the flow restricting body and being removed of contaminant in the exhaust air, a contaminant removal load of the filter is decreased, a contaminant removal rate in the exhaust air is improved, a cleaning performance is improved, and the exhaust air is efficiently cleaned and the cleaning efficiency of the exhaust air is stable in a long period.

An exhaust cleaning system of the present invention is an exhaust cleaning system according to the above invention, wherein the cleaning means has a receiving tank with a plain area equal to or exceeding that of the filer and arranged underneath said filter.

And the receiving tank with a plain area equal to or exceeding that of the filter is arranged underneath the filter.

Therefore, since the receiving tank with a plain area equal to or exceeding that of the filter is arranged underneath the filter, filter cleaning and a collection of a cleaning liquid after cleaning are simple in composition and are easy without soiling other parts.

Further, an exhaust cleaning system of the present invention is an exhaust cleaning system as claimed in the above invention, wherein the main body is equipped with a fire detection means for detecting fire and a shutter body for closing the exhaust outlet.

And the main body is equipped with a fire detection means for detecting fire and a shutter body for closing the exhaust outlet.

Therefore, since the main body is equipped with a fire detection means for detecting fire and a shutter body for closing the exhaust outlet, a fire, if any, is prevented from invading into the system by closing the exhaust outlet by the shutter body, and thereby damage by a flame can easily be prevented. Furthremore, and since the shutter body is provided at the exhaust outlet where the exhaust air that is mostly removed of contaminants flows, the shutter body is not soiled with contaminants and can normally operate, and maintenance can easily be made.

BEST MODE FOR CARRYING OUT THE INVENTION

Figure 1:
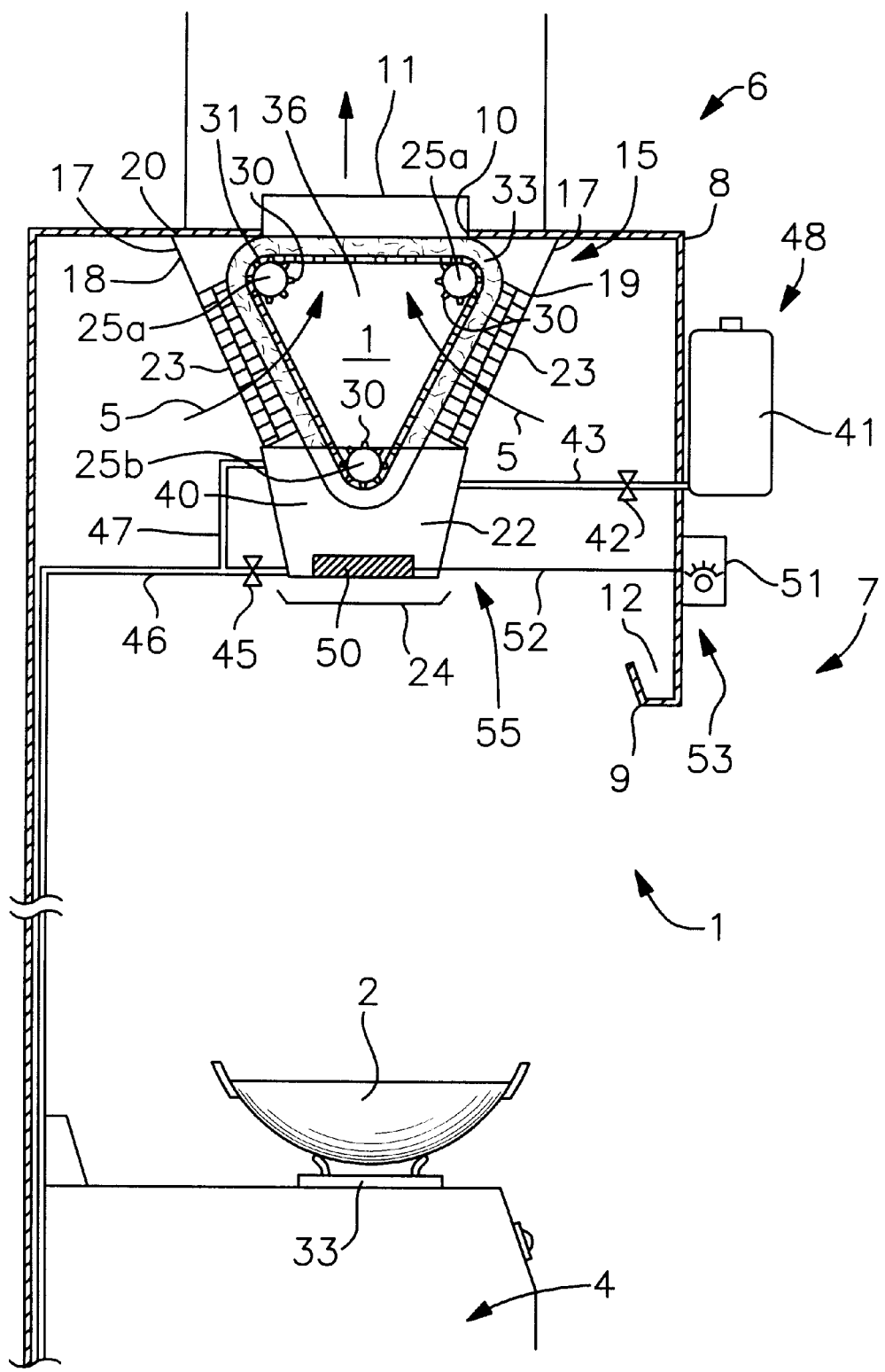
FIG. 1 is a front sectional view showing an embodiment of an exhaust cleaning system of the present invention.
Figure 2:
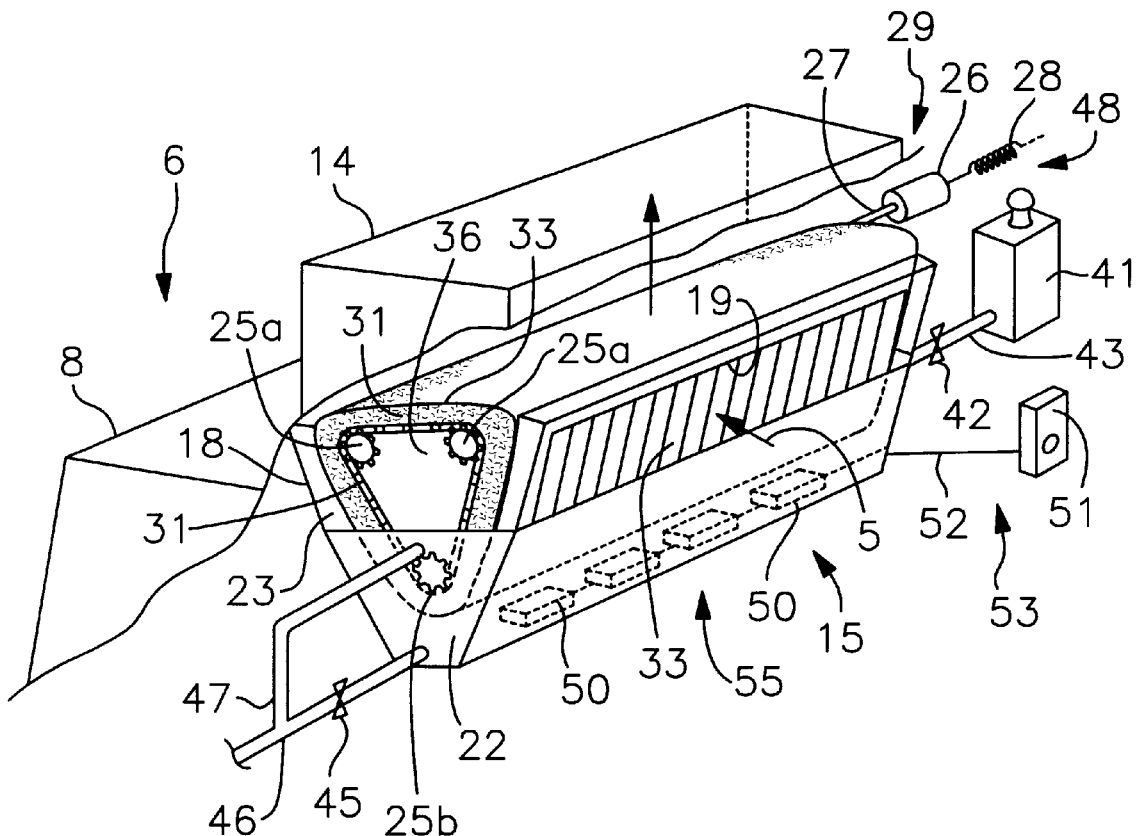
FIG. 2 is a partially cutaway perspective view of the above.

Next, an embodiment of the exhaust system according to the invention is explained hereunder, referring to the drawings.

n FIG. 1 and FIG. 2, a numeral 1 is a kitchen system, and the kitchen system 1 has a combustion system 4 having a fire source 3, such as a gas range on which a cooking device 2 can be mounted, and an exhaust system 6 for sucking an exhaust air 5 generated curing cooking and discharging the same outdoors.

Also, the exhaust system 6 has a hood 8 attached to a ceiling, not shown in the drawing, of a kitchen 7. The hood 8 is nearly a box shape with an inlet opening 9 that is opened in an lower face and forms a discharge opening 10 that is opened in a near center of an upper face. Further, at the discharge opening 10 of the hood 8, a fire damper 11 is provided as a shutter body to vary an open condition of the discharge opening 10, namely to close the discharge opening 10 in case of a fire. Additionally, the fire damper 11 may be operated manually to open/close the discharge opening 10 or actuated by a detection of a sensor for detecting smoke, a flame, heat and the like, not shown in the drawing.

Further, at a periphery of the inlet opening 9 of the hood 8, for example at a front and both sides, an internally bent concave trough 12 is provided. Also, at an upper part of the hood 8, an exhaust duct 14 is connected, of which one end is connected so as to cove the discharge opening 10 and the other end has a fan, a blower and the like that run outdoors and are not shown in the drawing. Further, in the hood 8, a main body of exhaust cleaning system 15 is arranged.

Here, the main body of exhaust cleaning system 15 has a pair of end plates 16, 16 that are formed nearly as an equal-leg trapezoidal plate with a heat resistant and corrosion resistant noncombustible material, such as a stainless steel plate, and a main body case 18 that is formed in a box shape having openings in upper and lower faces and expanding upward with a pair of side plates 17, 17 that are formed in a nearly rectangular plate with stainless steel plates and are provided at sides edges of these end plates 16, 16. Additionally, one of the end plates 16 is provided with a nearly circular inspection hole, which can be freely opened/closed by a cover (not shown in the drawing) and through which an inside of the main body case 18 can be checked, is provided, the pair of side plates 17, 17 are formed in a frame shape that respectively open inlets 19, 19, and an air that flows from these inlets 19, 19 into the main body case 18 is discharged from an exhaust outlet 20, an opening of the upper face of the main body case 18. Further, the side plate 17 is arranged so that a plain is approximately 45 degrees tilted with regard to a horizontal direction.

At a lower part of the main body case 18, a box-shaped cleaning liquid tank 22 that opens its upper face so as to cover the opening at a lower face is provided as a receiving tank. On each inner face side of the side plates 17, 17 of the main body case 18, louver type grease filters 23, 23, as flow restricting bodies, are attached to be freely mounted/dismounted so as to close the inlets 19, 19. Additionally, the grease filter 23, like a conventional grease filter, is a louver structure having multiple flow holes (not shown in the drawing) through which the exhaust air 5 flows, is attached to the side plate 17 that is tilted approximately 45 degrees, and is formed so that depositing contaminants, including oil/grease and tarry matters, do not drop. Meantime, to prevent contaminants from dropping, a collection member may otherwise be provided.

Further, underneath the main body case 18, a flat-saucer-shaped collection part 24 is provided for collecting a liquid that drops from the main body of exhaust cleaning system 15.

At the main body case 18, rotary shafts 25a, 25b, having an axial direction along a direction opposite from the pair of end plates 16 and both ends of which are held to freely rotate by bearings that are not shown in the drawing and are respectively provided at the end plates 16, 16, are arranged with a plural number, three pieces, for example. These rotary shafts 25a, 25b are arranged so as to come to vertexes of a nearly reverse triangle along the end plates 16, 16 in shape and the rotary shaft 25b positioned below is positioned in the cleaning liquid tank 22. Also, one of the rotary shafts 25a is projected at one end from the end plate 16, and an output shaft 27 of a motor 26, as a driving means arranged on the outer face side of the end plate 16 of the main body case 18, is connected to the projected end. Additionally, the motor 26 is supplied with and driven by a commercial AC power source that is properly phase-controlled by a control means, not shown in the drawing, by way of a power cable 28, and thereby a moving means 29 is formed.

Also, at both ends of the rotary shafts 25a, 25b, gears 30, 30 are provided, and the gears 30, 30 are spanned with endless chains 31, 31 so that the rotary shafts 25a, 25b rotate in the same direction driven by the motor 26. To the chains positioned at both ends of the rotary shafts 25a, 25b, both side edges of an endless-belt-shaped filter 33 are attached so as to connect them.

Figure 3:
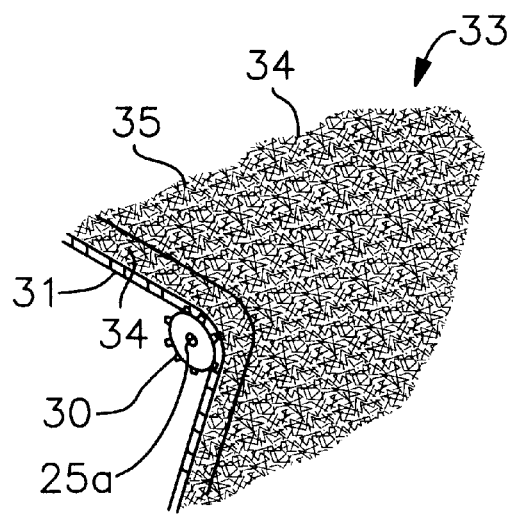
FIG. 3 is a perspective view showing a filter part of the above.

The filter 33 is, shown in FIG. 3, formed with an endless net 34 formed in a mesh shape with stainless steel wires, for example, and both ends of which are respectively attached to the chains 31, 31, and a mat part 35 gathered into a mat form with stainless steel wires, for example, and monolithically provided to an outer face of the net. Additionally, for the stainless steel wires composing the filter 33, for example, a 100 um thin-wire-shaped stainless steel wires or a slender-ribbon-shaped stainless steel sheet are used, and the mat part 35 is gathered into a fibrous microfiber and formed in a permeable mat shape. Further, the filter 33 of its both ends is attached to the chains 31, 31 that are spanned to the rotary shafts 25a, 25b, which are arranged to come to vertexes of a nearly reverse triangle, and is formed in a nearly triangular tube shape having a space 36 formed inside so that a lower end corner is positioned in the cleaning liquid tank 22.

Additionally, the filter 33 is, at its upper face of a part spanned between the rotary shafts 25a, 25a, located nearly at the same position with an upper edge of the main body case 18, and the upper face part closely covers the discharge opening 10. Also, the filter nearly touches and adheres to each inside face of the grease filters 23, 23 at its outer face of a part spanned between the upper rotary shafts 25a, 25a and the lower rotary shaft 25b.

Further, a plain area of the filter 33 covering an upper part of the exhaust outlet 20 is nearly the same as an area of an upper opening of the cleaning liquid tank 22, namely view in a plan, the cleaning liquid tank 22 is the same as or slightly larger than the filter 33 so that a cleaning liquid if dropped from the filter 33 can be collected by the cleaning liquid tank 22.

Additionally, since the grease filter 23 is a louver structure, oil/grease and tarry matters adhering to the grease filter 23 and a cleaning liquid and the like dropped from the filter 33 are lead to and collected by the cleaning liquid tank 22. Also, the grease filter 23 is not required to have such a high removal rate as is conventionally required for contaminants. That is, since contaminants are removed by the filter 33, removal may be just supplementary or almost zero, and a construction that simply makes the filter 33 invisible from an outside for protection and functions as a cover to prevent an externally moving cooking device from being caught by the filter 33, is enough.

And the main body of exhaust cleaning system 15 is closely attached so that an upper end of the main body case 18 covers the discharge opening 10 at an upper bottom face of the hood 8 and connect the exhaust outlet 20 of an upper face of the main body case 18 to the discharge opening 10 under an airtight condition so as the filter with its upper face to close the discharge opening 10, namely to cover the same without any clearance. Additionally, the main body of exhaust cleaning system 15 is formed of its exhaust air path so that the exhaust air 5 that flows from the inlet opening 9 of the hood 8, namely the exhaust air 5 containing an oil/grease evaporated from cooking oils during cooking and tarry matters formed with an oil/grease by adhering to aerial dust is passed through the inlets 19, 19 of the main body of exhaust cleaning system, the grease filters 23, 23, side faces of the filter 33 adhering to the grease filter 23, the space 36 in the filter 33, the discharge opening 10 where the fire damper 11 is provided by way of the upper face of the filter 33 covering the discharge opening 10, and the exhaust duct 14, and is discharged outdoors.

An upper part of one end of the cleaning liquid tank 22 is connected to a tank 41 for storing a cleaning liquid 40 that is attached to a front face of an outer surface of the hood 8 by way of a supply tube 43 having a supply valve 42, and the cleaning liquid 40 is supplied from the tank 41 by way of the supply tube 43 and stored in the cleaning liquid tank 22. Additionally, the cleaning liquid 40 is, for example, mainly composed of an amine soap made of tolu oil conditioned with an oleic acid and a linolic acid extracted from plants, such as pine, and the amine soap is mixed with a higher-alcoholic anionic surfactant. Incidentally as a cleaning liquid used for this purpose, one that has a high cleaning performance particularly with respect to oil/grease, has an antimicrobial activity, is neutral, does not contain antiseptics and phosphorus, and is colorless and noncombustible, is desirable.

Further, to a bottom part of another end of the cleaning liquid tank 22, a discharge tube 46 having a discharge valve 45 for discharging the cleaning liquid 40 stored in the cleaning liquid tank 22 is connected. Also, to an upper part of the other end, one end of an overflow tube 47 for regulating the cleaning liquid 40 stored in the cleaning liquid tank 22 at a constant volume is connected, and if the cleaning liquid 40 is supplied to the cleaning liquid tank 22 exceeding the prescribed volume, an excess volume is overflown and discharged from the overflow tube 47 through the discharge tube 46. Additionally, a volume of the cleaning liquid 40 is set such that the filter 33 at its lower end positioned in the cleaning liquid tank 22 is immersed in the cleaning liquid 40. Thus, a cleaning liquid supply/discharge means 48 is formed with the cleaning liquid 40, the tank 41, the supply tube 43 having the supply valve 42, the discharge tube 46 having the discharge valve 45, and the overflow tube 47.

In the cleaning liquid tank 22, a trembler 50 generating fine vibrations is arranged, and an ultrasonic cleaning means 53 that is connected to an ultrasonic transmitter 51, arranged at a front on an outer face side of the hood, with a lead wire 52 is formed with the trembler 50. The ultrasonic cleaning means 53 is composed such that the trembler 50 vibrates by an operation of the ultrasonic transmitter 51, the cleaning liquid 40 stored in the cleaning liquid tank 22 ultrasonically vibrates to ultrasonically clean the filter 33 a part of which is immersed in the cleaning liquid 40 in the cleaning liquid tank 22.

Thus, a cleaning means 55 is formed with the ultrasonic cleaning means 53, the cleaning liquid supply means 48 and the cleaning liquid tank 22.

Further, in the cleaning liquid tank 22, a gauge, not shown in the drawing, is provided to facilitate an external visual check of the cleaning liquid 40.

Next, an operation of above first embodiment is described.

First, the tank 41 and the ultrasonic transmitter 51 attached to the hood 8 are respectively connected to the main body of exhaust cleaning system 15 which is previously assembled inside the hood 8, and thereby the exhaust system 6 is formed. After the cleaning liquid 40 is filled in the tank 41, making sure that the discharge valve 45 is closed, a prescribed volume of the cleaning liquid 40 is supplied to the cleaning liquid tank 22 of the main body of exhaust cleaning system 15 by opening the supply valve 42, while observing a gauge not shown in the drawing. Additionally, when the cleaning liquid 40 is flown exceeding the prescribed volume, an excess volume is overflown and discharged from the discharge tube 46 through the overflow tube 47.

Thereafter, suction is performed by operating a fan and a blower, not shown in the drawing, of the exhaust duct 14. Further, the filter 33 is circulatingly and rotationally moved by operating the motor 26 and a cooking preparation is done by operating the ultrasonic cleaning means 53.

Next, a cleaning operation of the exhaust air 5 by above-mentioned embodiment is described.

By cooking, a vapor of oil/grease is generated and an air containing the vapor, namely the exhaust air 5 is absorbed from the inlet opening 10 of the hood 8 by an operation of the fan and the blower. Further, the exhaust air absorbed into the hood 8 is absorbed from the inlets 19, 19 of the main body of exhaust cleaning system 15 and is flown nonlinearly through flow holes, not shown in the drawing, of the grease filters 23, 23. While flowing through the grease filter 23, a part of dust, oil/grease and tarry matters in air deposit and are separated and removed from the exhaust air 5.

Also, the exhaust air after passing through the grease filter 23 passes through a side face part of the filter 33 that is closely adjacent to the grease filter 23 and flows into the space 36 in the filter 33. Additionally, in flowing through the filter 33 which is formed with gathered fine stainless steel wires, the exhaust air 5 flows nonlinearly through a narrow clearance of stainless steel wires inside the filter 33. Further, since the filter 33 is formed with gathered fine stainless steel wires, its specific surface area is large compared to the grease filter 23, a flow path through which the exhaust air 5 flows is very narrow, and what is more, like the grease filter 23, contraction is frequently repeated, and thereby contaminants in the exhaust air 5, including fine dust, oil/grease and tarry matters, are mostly caught by the filter 23 and are separated and removed.

Further, the exhaust air 5 absorbed by the space 36 flows through an upper part of the filter 33. By flowing through the filter 33 again, by a similar action contaminants in the exhaust air 5 are almost completely separated and removed and the exhaust air 5 is cleaned. By way of the discharge opening 10 of the fire damper 11, the exhaust air 5 is absorbed by the exhaust duct 14 and is discharged outdoors.

Also, by a rotational movement effected by the motor 26, the filter 33 of its part where contaminants separated and removed from the exhaust air 5 deposit is immersed in the cleaning liquid tank 22 in which the cleaning liquid 40 is stored and the ultrasonic cleaning means 53 operates, and by a synergy cleaning effect of the cleaning liquid 40 and ultrasonic waves, contaminants are almost completely removed from the filter 33, so that a new part cleaned in the cleaning liquid tank 22 is opposed to the inlet 19 by moving rotationally by operating motor.

Additionally, when the cleaning liquid 40 is contaminated by a used for a prescribed time, by opening the discharge valve 45, the contaminated cleaning liquid 40 stored inside is discharged by way of the discharge tube 46. Thereafter, closing the discharge valve 45 again, the supply valve 41 is opened and the cleaning liquid 40 is supplied to the cleaning liquid tank 22 of the main body of exhaust cleaning system 15 up to the prescribed volume, while observing the gauge. Additionally, desirably the cleaning liquid 40 is collected separately by an effluent vessel and is treated separately so as to allay a burden of sewage treatment.

If a shortage of the cleaning liquid 40 is observed via the gauge due to evaporation and the like, though the cleaning liquid 40 is not so much contaminated and there is no need to replace the cleaning liquid 40, opening the supply valve 42, the cleaning liquid 40 is supplied to the cleaning liquid tank 22 of the main body of exhaust cleaning system, while observing the gauge.

According to the above first mentioned, since the exhaust air 5 flowing from the inlets 19, 19 of the main body of exhaust cleaning system 15 is flown through and cleaned by the permeable filter 33, where contaminants in the exhaust air 5 are caught, separated and removed by the filter 33, and is discharged from the discharge opening 10 connected to the exhaust outlet 20, while the filter 33 on which the contaminants separated and removed from the exhaust air 5 deposit is cleaned by contact with the cleaning liquid 40, namely by immersion in the cleaning liquid 40; cleaning operations such as to remove and clean components and clean inside the exhaust duct 14 after using the kitchen system 1, a nearly automatic cleaning is possible, the exhaust air 5 is cleaned efficiently and easily, and an easy maintenance is possible.

Also, since the filter 33 is moved and immersed and cleaned in the cleaning liquid tank 22 in which the cleaning liquid 40 is stored, a contamination of other parts by splashes of the cleaning liquid 40 can be prevented, there is no loss in cleaning liquid 40 by a splashed cleaning liquid being discharged together with the exhaust air 5 by way of the duct 14, and thus the cleaning liquid 40 is used effectively for cleaning.

Further, since the filter 33 is moved with the discharge opening 10, connected to the exhaust outlet 20 through which the exhaust air 5 is discharged, closed, the filter 33 can be cleaned while simultaneously separating and removing contaminants in the exhaust air 5, and by automation, there is no need to break off cooking and stop the main body of exhaust cleaning system 15 to clean the filter.

Still further, unlike cleaning the exhaust air 5 using a conventionally fixed filter in which the exhaust air 5 is cleaned by the same face and contaminants are caught by a part of the filter, resulting in a degradation in cleaning efficiency and a fear of an air sound accompanying a biased flow of the exhaust air 5. On the other hand in the above first embodiment, by moving the filter 33, contaminants are caught equally by an entire face of the filter 33, and the exhaust air 5 can be cleaned efficiently.

Also, as the filter 33 formed as an endless belt is spanned and is rotationally moved by forming a nearly reverse triangle having the space 36 inside, the exhaust air 5 can be flown twice through the filter 33 with a simple construction, contaminants in the exhaust air 5 can be removed almost completely, the fire damper 11, the exhaust duct 14, the fan and the blower cleaning of which is difficult are not contaminated, the fire damper 11, the fan and the blower can operate normally, an easy maintenance is possible, and the filter 33 can be thinned. Further, since the filter 33 can freely be changed in shape, assembly operations, including spanning, are made easy, and it is also possible to freely change the filter 33 in shape so as to cope with an installation space to mount the main body of exhaust cleaning system 15, and thereby workability and productivity can be improved. Also, since the filter 33 formed in a tubular shape is rotationally moved, no other space is necessary for movement, and thus a compact design is easily applicable.

Further, since the filter 33 is formed by gathering slender stainless steel wires or thin stainless steel sheets, the filter 33 can be formed flexible, noncombustible, highly corrosion resistant and highly strong, it can be used under an atmosphere where a heat load is applied, such as the kitchen system 1, does not generate corrosion and rust and can stably clean the exhaust air 5 for a long period and maintenance is made easy, and since a conventional gathering process of metal wires, as is, can be used for production, production is easily possible at a low cost, and productivity can be improved.

Also, since the filter 33 is attached to the chains 31, 31 spanned to rotary shafts 25a, 25b and is rotationally moved by the motor 26, a movement load is not applied directly to the filter 33 and a damage in the filter 33 can be prevented, and the tubular shape of the filter 33 can be axially maintained, without causing sagging, by the rotary shafts 25a, 25b, thereby preventing a biased cleaning of the exhaust air 5 that otherwise may be caused due to sagging and the interference with other parts.

On the other hand, since the filter 33 is cleaned by the synergy effect of chemical cleaning by the cleaning liquid 40 and physical cleaning by the ultrasonic cleaning means 53, contaminants caught by filter 33 can be removed almost completely, a clogging in the filter 33 can be prevented, and the exhaust air 5 can be cleaned effectively for a long period.

Also, since a transmission of an ultrasonic wave of the ultrasonic cleaning means 53 is adjusted and controlled by the ultrasonic transmitter 51 provided outside the hood 8, operation can be done easily.

Further, since the cleaning liquid tank 22 is formed so the area of the upper opening is nearly the same as the plain area of the filter 33 and is arranged underneath the filter 33, an immersion cleaning of the filter 33 in the cleaning liquid 40 can be designed with a simple formation, and even if the cleaning liquid 40 drops from the filter 33 when the filter 33 is moved upward from the cleaning liquid 40, collection is possible without allowing dropping onto the combustion system 4 and the like, so a contamination of other parts can be prevented.

Also, since the cleaning liquid 40 stored in the cleaning liquid tank 22 into which the filter 33 is immersed is supplied and disposed by the cleaning liquid supply/discharge means 48, operations such as to pour the cleaning liquid 40 into the cleaning liquid tank 22 is not necessary and so other parts are not contaminated due to overflowing and splashing during pouring, and when the cleaning liquid 40 is properly stored in the tank 41 that is externally provided and to which supply is made easily, the cleaning liquid 40 can easily be supplied/discharged by opening/closing the supply valve 42 and the discharge valve 45.

Further, since the gauge is provided at the cleaning liquid tank 22, a supply/discharge of the cleaning liquid 40 can easily be done, and it is easily possible to confirm that the cleaning liquid 40 is stored up to the prescribed volume.

Also, the cleaning liquid 40 is mainly composed of an amine soap, a noncombustible, vegetable neutral detergent made of tolu oil and contains a higher-alcoholic anionic surfactant, a high cleaning power can be obtained, and being vegetable that can be decomposed by microbes, the cleaning liquid 40 after cleaning can easily be treated, is not stimulating a skin, can easily be handled, and is available for an atmosphere where a heat load is applied, such as the kitchen system 1. Further, since the cleaning liquid 40 is a neutral vegetable detergent, a deodoring effect can be attained by odor contents in the exhaust air 5 adhering to the cleaning liquid 40 that deposits on the filter 33.

On the other hand, since the grease filter 23 having flow holes that does not allow a linear flow of the exhaust air 5 is arranged closely adjacent on the upper reach of the filter 33 along the flow direction of the exhaust air 5 so as to cover the filter 33 and contaminants can be separated and removed to a certain degree before removing contaminants by the filter 33, a contaminant removal load of the filter is decreased, a cleaning load of the filter 33 is decreased, and a contaminant removal rate is improved and the exhaust air 5 is efficiently cleaned for a long period. Further, since the filter 33 is covered by the louver type grease filter 23, the filter 33 is externally invisible and an appearance is improved.

Further, since the grease filter 23 is formed as a louver structure that does not allow contaminants adhering to the grease filter 23 to drop when the grease filter 23 is attached having an inclination, other parts are not soiled.

Still further, since the grease filter 23 is arranged having a 45-degree inclination, it is possible to flow the exhaust air 5 into the main body of exhaust cleaning system 15 so as to form a smoothly flowing air path with a small space, the exhaust air 5 can efficiently be absorbed and cleaned, thereby improving a cleaning efficiency of the exhaust air 5.

Also, since the fire damper 11 is attached at the exhaust outlet 20, a fire occurring during cooking, if any, can easily be prevented from invading into the main body of exhaust cleaning system 15 by closing the exhaust outlet 20, and being arranged at the exhaust outlet 20 through which the cleaned exhaust air 5 passes, the fire damper 11 is protected against an adhesion of contaminants and can normally operate, and maintenance can easily be made.

Further, since the inspection hole is provided in the main body case 18, maintenance can easily be made.

Also, since the collection part 24 is arranged underneath the cleaning liquid tank 22, a drop of contaminants adhering to an outer periphery of the cleaning liquid tank 22 can be prevented. Namely, since the cleaning liquid tank 22 of its outer face is cooled because the cleaning liquid 40 is stored, there is a fear that contaminants in the exhaust air 5 forms dews on the outer face of the cleaning liquid tank 22 and these contaminants drop, but since the collection part 24 is a flat saucer shape that is heated during cooking and is hard to generate dews and dews if generated are soon evaporated, there is scarcely a fear of drop from a bottom face of the collection part 24.

Additionally, in above first embodiment, a composition in which the filter 33 is formed as an endless belt and is attached to and rotationally moved by the chains 31, 31 is described, but a composition such that slender-plate-shaped bridge members, for example, made of stainless steel plates are provided with prescribed intervals so as each to be connected with the chains 31, 31 that are positioned at both ends of the rotary shafts 25a, 25b, and the endless-belt-shaped filter 33 is set to the bridge members so that the filter 33 is rotationally moved along with a rotational movement of the chains 31, 31 accompanying a rotation of the rotary shafts 25a, 25b is also possible. According to this composition, a sag in the filter 33 positioned between the rotary shafts 25a, 25b can be prevented, and further a biased cleaning of the exhaust air 5 and a hindrance to movement, such interference with other parts, can be prevented, and the filter 33 can be rotated and moved smoothly.

Figure 4:
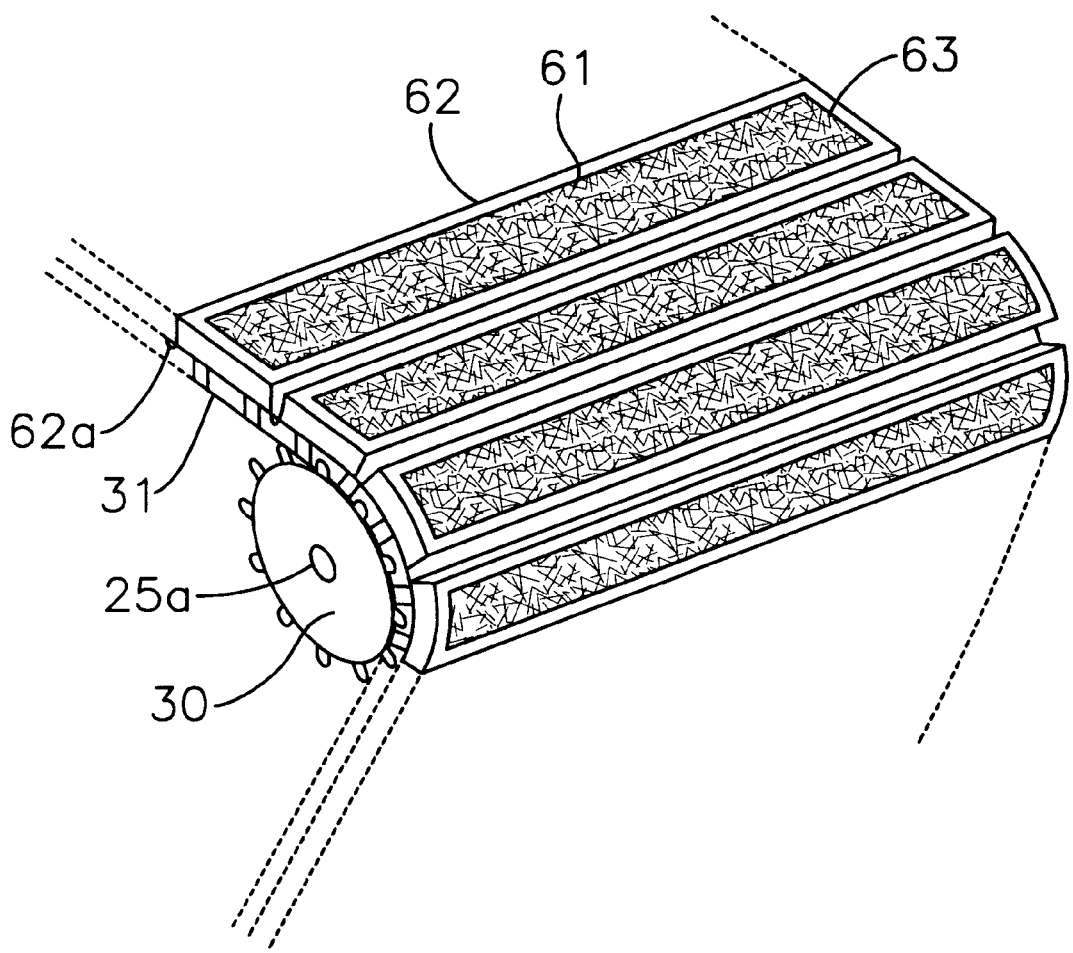
FIG. 4 is a perspective view of a filter part showing another embodiment of an exhaust cleaning system of the present invention.

Further as shown in FIG. 4, a composition such that holding members 62 each as a filter holding part, formed in a frame shape having a window 61, having hinges engaged to mutually move on both sides in a length direction, and holding a mat-shaped filter 63 and the grease filter 23 so as to close the window 61 are connected in an endless chain form and composed as an endless belt, and both ends of these holding members 62 are connected to chains 31, 31 with metal fittings 62a and the like to form a nearly tubular shape for a rotationally movement. According to the composition shown in FIG. 4, a movement load is not directly applied to the filter 63, a damage of the filter 63 can be prevented, the filter 63 can be moved without causing a sag, the filter 63 can easily be mounted/dismounted only by mounting to/dismounting from the filter 63 from the window 61, the filter 63 can be formed as a simple rectangular shape, and productivity and maintenance, including a replacement of the filter 63, can be improved.

Figure 5:
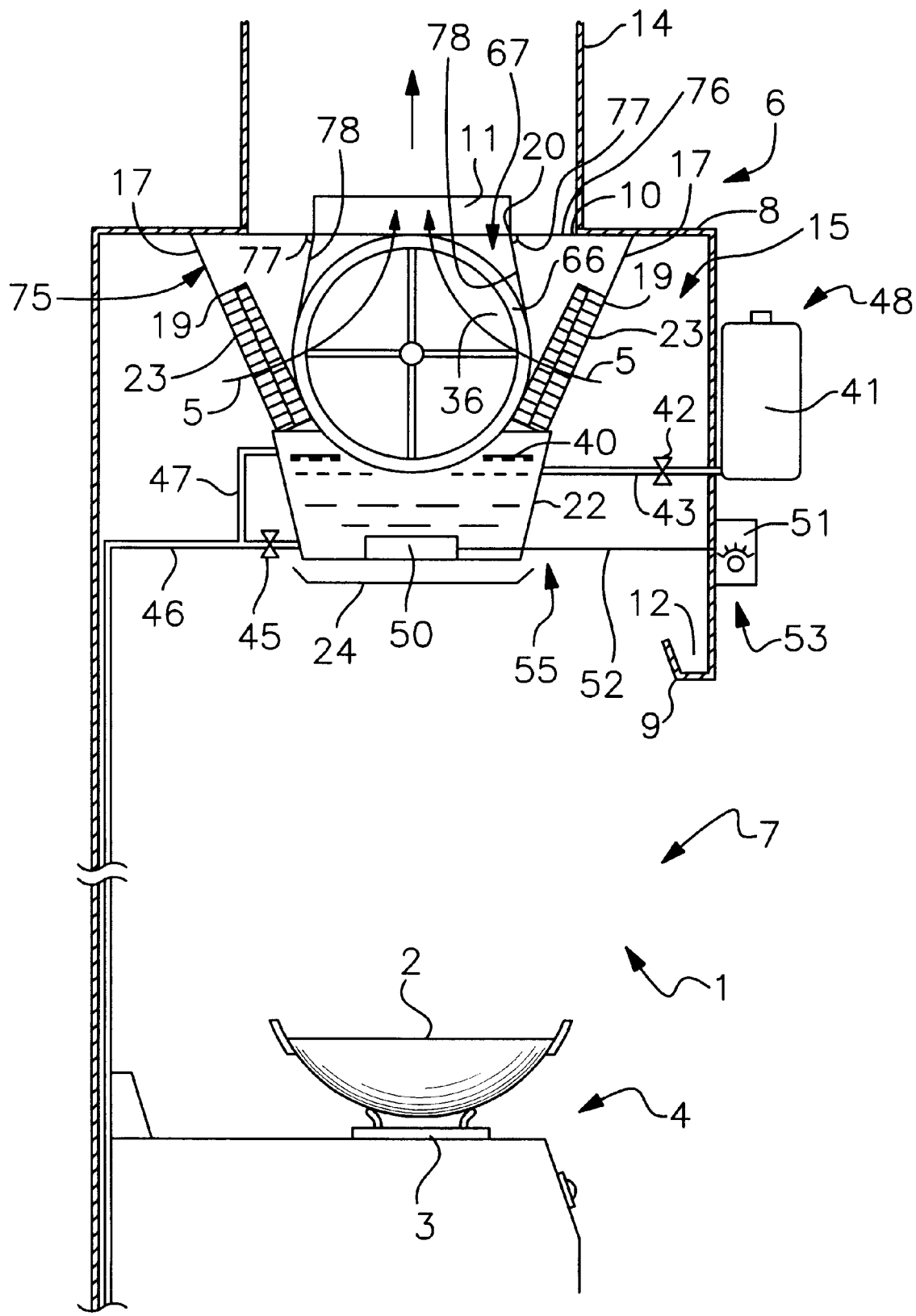
FIG. 5 is a front sectional view showing still another embodiment of an exhaust cleaning system of the present invention.
Figure 6:
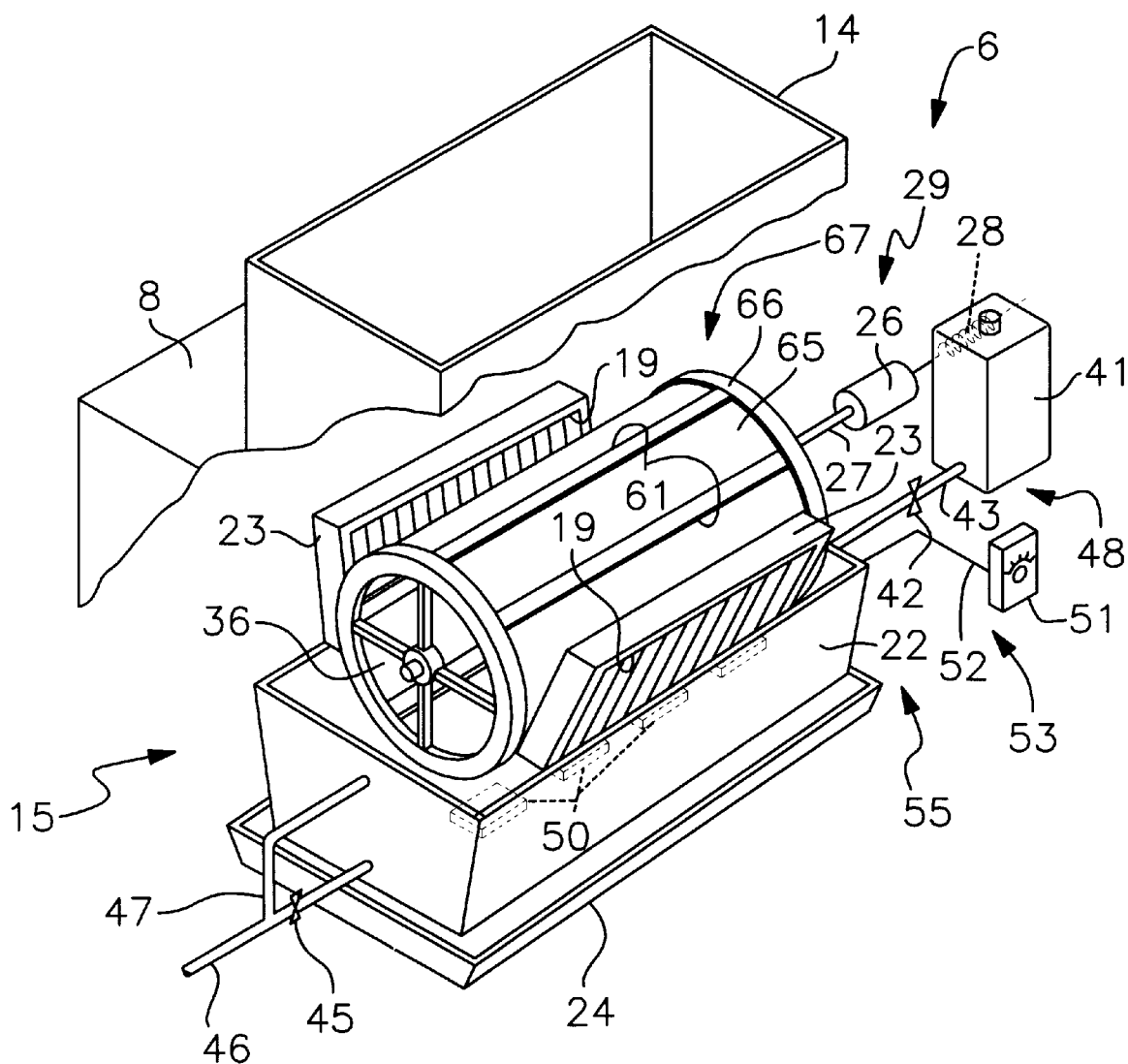
FIG. 6 is a partially cutaway perspective view of the above.
Figure 7:
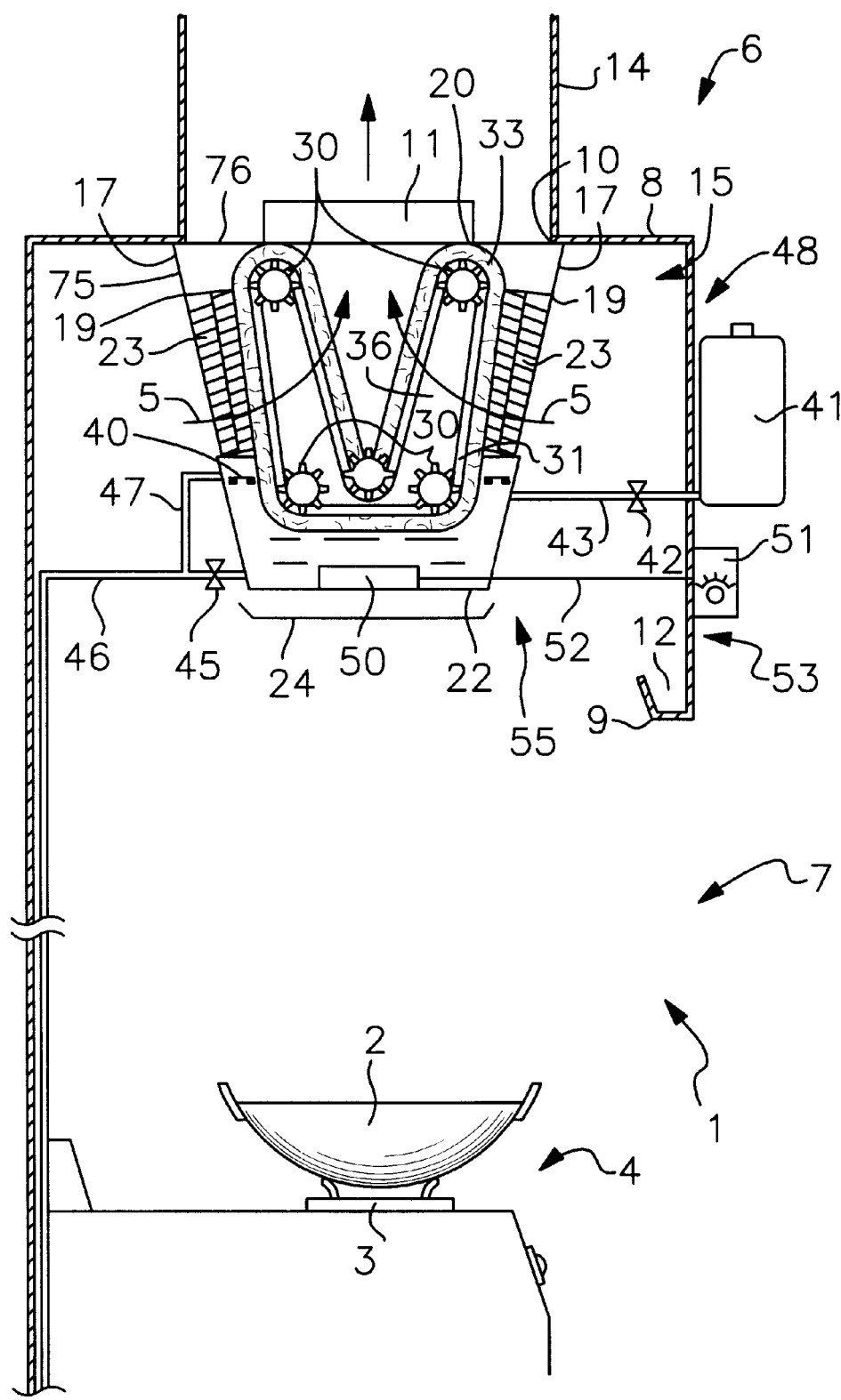
FIG. 7 is a front sectional view showing still another embodiment of an exhaust cleaning system of the present invention.
Figure 8:
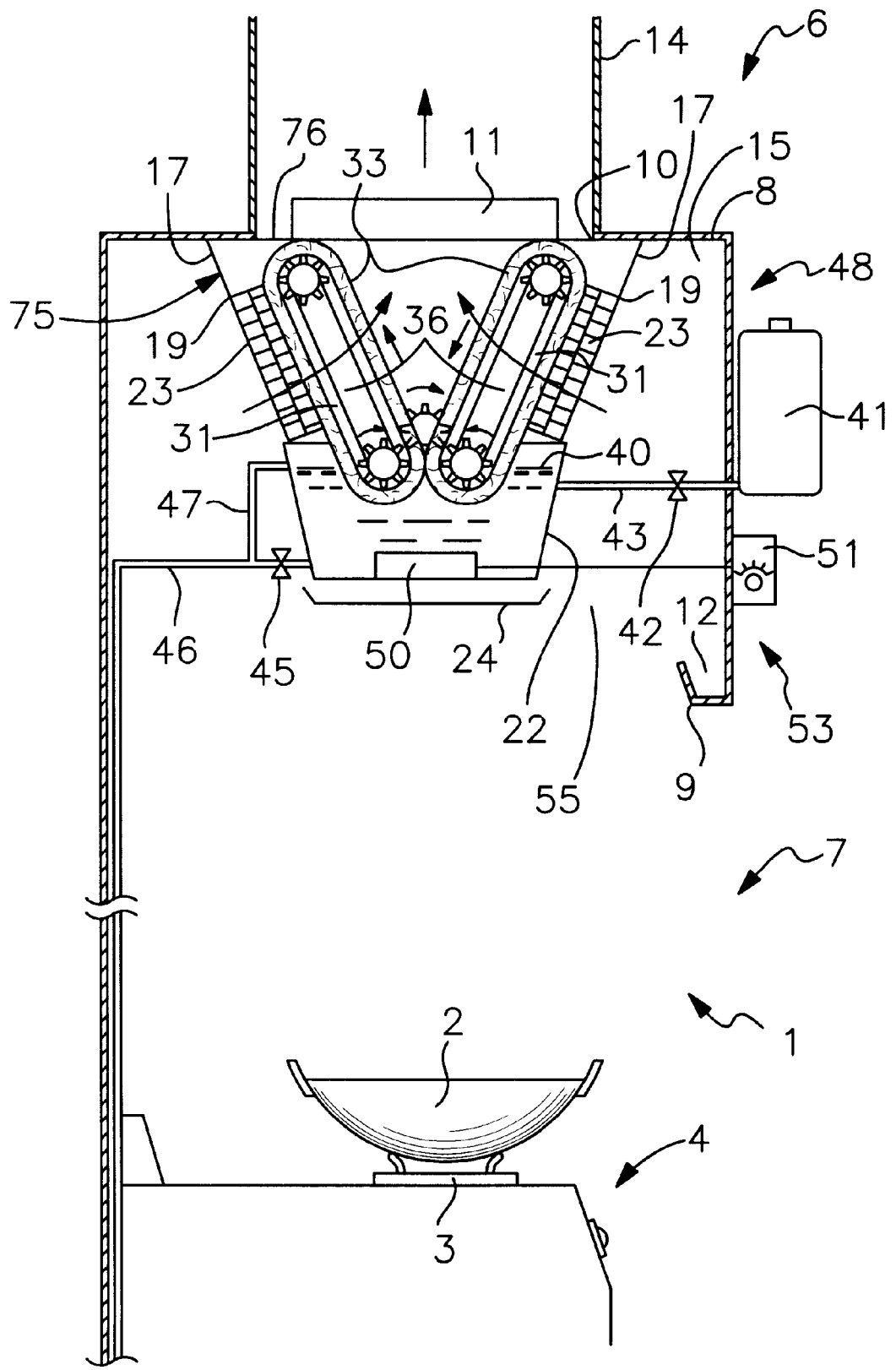
FIG. 8 is a front sectional view showing a periphery of a main body case showing still another embodiment of an exhaust cleaning system of the present invention.

Additionally, though the filter 33 is spanned to the rotary shafts 25a, 25b and is formed in a nearly reverse triangular tubular shape in the description, a composition in which the filter 33 is formed in a tubular shape shown in FIGS. 5 and 6, or as shown in FIG. 7, the filter 33 is an endless belt shape is spanned with multiple foldings, or as shown in FIG. 8, the filter 33 is formed in a flat tubular belt conveyer shape, is also applicable, and thus the filter 33 may be spanned and formed in a tubular shape or a monolithic tubular shape.

Further, when a composition in which, by forming a tubular shape shown in FIGS. 5 and 6, namely by forming a monolithic tubular filter body 67 in which a mat-shaped filter 65 is held by a filter holding part 66 formed in a drum frame shape, the filter body 67 is rotated around the filter holding part 66 as a rotation axis to clean the exhaust air 5 is employed. In case where the filter body is formed in a drum-shaped, since the filter body 67 is a drum-shaped attachment structure, the filter 65 can easily be replaced by replacing the filter body 67, and like a composition shown in FIG. 4, the filter 65 is free of a direct movement load and a consequent damage and can be moved without causing a sag.

Still further, in the case of a composition shown in FIG. 7 in which the belt-shaped filter 33 is spanned in a tubular shape by folding the same multiple times, since the exhaust air 5 can be flown through the filter 33 multiple times, even the exhaust air 5 under an extremely soiled condition can be cleaned almost completely.

Also, in the case of a polygonal or a flat tubular formation shown in FIG. 8, since a composition in which a corner and a flat side is immersed in the cleaning liquid 40 in the cleaning liquid tank 22 is possible, a compact design is easily applicable. Additionally, in the composition shown in FIG. 8, the filter 33 is arranged symmetrically, but one side only is also possible, and in this case, since the flat filter 33 can be arranged in a small space, a further compact application is possible.

Figure 9:
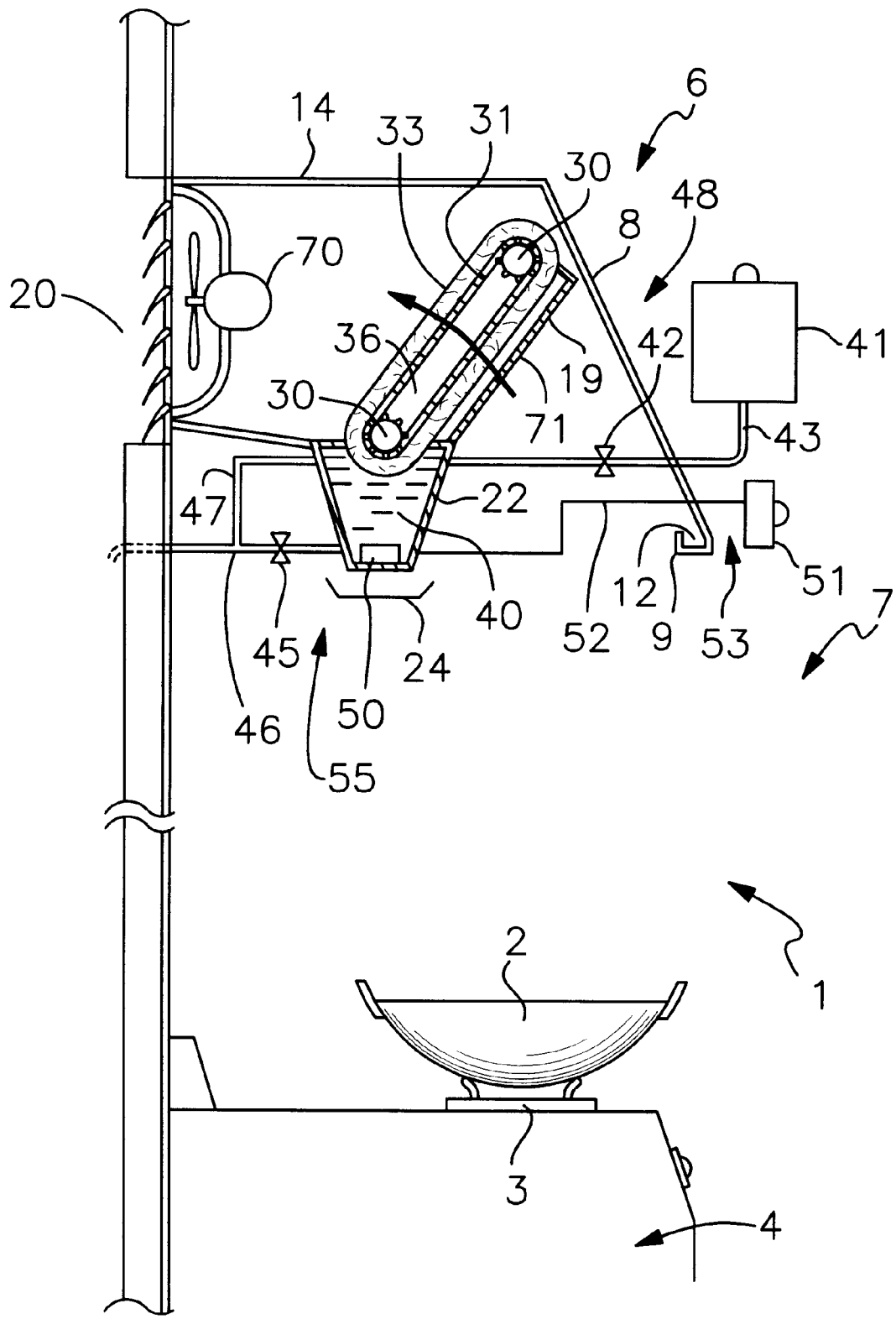
FIG. 9 is a perspective view showing still another embodiment of an exhaust cleaning system of the present invention.
Figure 10:
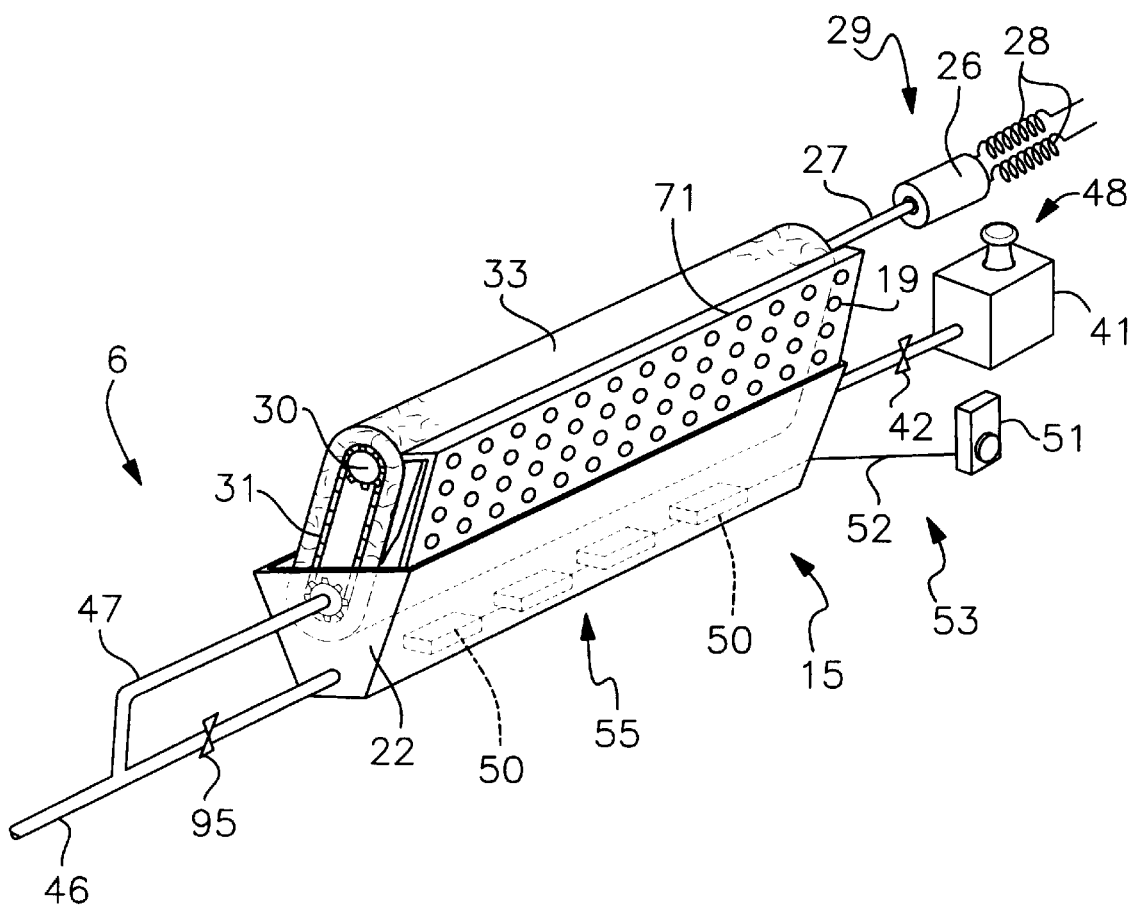
FIG. 10 is a partially cutaway perspective view showing the exhaust cleaning system of the above.

In a composition shown in FIG. 8, filter 33 is arranged but that is shown in FIGS. 9 to 10.

That is, as shown in FIGS. 9 and 10, a compact design by a composition in which the endless-belt-shaped filter 33 is spanned in a flat tubular shape so that a plain is opposed to a fan 70 and an upper part is tilted in a direction receding from the fan and a grease filter 71, as a flow restricting body, having punched flow holes 19 on a face side not opposing to the fan 70 that comes to an lower face side of the filter 33 is arranged in the hood 8 to be freely mounted/dismounted, can be used at households, too. Additionally, the filter 33 can be spanned nearly vertically instead of tilted spanning.

On the other hand, as the cleaning liquid 40, in addition to one mainly composed of amine soap, any one that has a high cleaning performance and does not corrode filters 33, 63 and 65 and the cleaning liquid tank 22 is acceptable, and desirably one that can easily be treated and handled, and one that is noncombustible particularly for use at a place where a heat load is applied, such as a kitchen.

Also, in addition to gathered stainless steel wires, the filters 33, 63 and 65 can be made of a material that has a permeability for the exhaust air 5 to flow through, can remove contaminants in the exhaust air 5 and is not damaged by contact with the cleaning liquid 40, but for used at a place such as a kitchen where are heat load is applied, a material that do not easily cause corrosion and rust and is noncombustible, such as an aluminum alloy wire, is desirable. In addition, if the exhaust air 5 contains a hazardous gas, the filters 33, 36 and 65 may carry activated carbon particles, or a permeable activated carbon sheet (developed by the British Department of Defense and produced by SGS Yarsley International Certification Services Ltd.; trade name ACC) may be used as a filter or the activated carbon sheets may be superposed with the filters 33, 63 and 65 so as they are positioned on the space 36 side, or a fibrous activated carbon may be gathered and used as a filter. Using these activated carbon products, such a hazardous gas is adsorbed and removed, and odor is removed, too.

Further, on a top end side of the discharge tube 40, a clarifier for clarifying the contaminated cleaning liquid 40 may be provided and a circulation system for returning the clarified cleaning liquid 40 to the cleaning liquid tank 22 may also be provided. According to these compositions, in addition to that the cleaning liquid 40 can be used efficiently, a sewage treatment load due to discharging the contaminated cleaning liquid 40 as is into sewage can be decreased.

Also, a composition such that a means for detecting a volume of the cleaning liquid 40 is provided in the cleaning liquid tank 22, and by detecting that the cleaning liquid 40 is in short, the cleaning liquid 40 is supplied from the tank 41, such as a float valve, may also be provided. According to this composition, it is possible to prevent a situation that the cleaning liquid 40 is scarce and the filters 33, 63 and 65 cannot be cleaned, and thus a sure and efficient cleaning of the exhaust air 5 can be performed for a long period.

Further, a composition in which a roller or a air injection means may be provided on a side where the filters 33, 63 and 65 move from the cleaning liquid 40 and thereby the filters 33, 63 and 65 are pressed and removed of the cleaning liquid 40 may also be provided. According to this composition, a drop of the cleaning liquid 40 from the filters 33, 63 and 65 can be prevented, without soiling other parts, and by providing the roller and the like, an air path for flowing the exhaust air 5 to the filters 33, 63 and 65 can be formed simultaneously by a simple composition, the exhaust air 5 can be thoroughly cleaned, and a cleaning efficiency can be improved by a simple composition. Further, by providing the roller, there is a fear that a noise is generated when the filters 33, 63 and 65 are rotated and rotationally moved while keeping close contact with the grease filter 23, but since the roller rotates along with the rotation and rotational movement of the filters 33, 63 and 65, no noise is generated, a friction due to the close contact can reduce a load of rotational movement and thus the filters 33, 63 and 65 can be moved smoothly. When the filter 33, 63 and 65 are not rotated, no noise is generated.

Also, though the filter 33 is stuck to the exhaust outlet 20 and the grease filter 23, for example, like an embodiment shown in FIGS. 5 and 6, by employing a composition in which a movable plate 78, that is energized by the coil spring 77 and the like and of which one end is a free end, is provided at a top 76 having the exhaust outlet 20 of the main body case 75 as a main body in a center part, the movable plate 78 may be stuck to an outer face side of the filter 65. According to this composition, even when the filters 33, 63 and 65 are not stuck to the exhaust outlet 20 and the grease filter 23, the exhaust air 5 can surely flow through the filters 33, 63 and 65 by a simple formation, and the exhaust air 5 can thoroughly be cleaned and a cleaning efficiency can easily be improved by a simple composition. In particular, as shown in the embodiment of FIGS. 5 and 6, application is possible with a simple formation to a construction having a curved outer face for forming an air path through which the exhaust air 5 can smoothly flow. Further, a pressing effect of the filters 33, 63 and 65 can be obtained.

On the other hand, though the description is given by arranging the grease filter 23, for example, as shown in FIGS. 9 and 10, a grid body, either formed with mesh or punched, may be attached to the inlet 19 of the side plate 17 of the main body case 18 to be freely mounted/dismounted, or by directly punching the side plate 17, the punched holes may be used as the inlet 19. These compositions can provide a compact, lightweight main body of exhaust cleaning system 15 for use at an environment where oil/grease is not generated so much.

Also, though the description is given such that the exhaust air 5 is cleaned by operating the ultrasonic cleaning means 53, it is also possible to start cleaning the filters 33, 63 and 65 by a cleaning ability of the cleaning liquid 40, and ultrasonic cleaning may be applied when a cleaning power starts degrading. According to this composition, a running cost can be reduced. Further, when a contamination of the exhaust air 5 is low or contaminants can easily be removed by the cleaning liquid 40, a simple, inexpensive construction without the ultrasonic cleaning means 53 may be provided separately to improve productivity and provide a compact system.

On the other hand, though the filter 33, 63 and 65 are rotated and rotationally moved to immerse a part into the cleaning liquid for cleaning while cleaning the exhaust air 5, when a time of continuous running is short and the exhaust air 5 is cleaned by an intermittent running, for example, the filter 33, 63 and 65 are not moved during cleaning the exhaust air 5 but a composition in which the filters 33, 63 and 65 are moved in parallel, or by moving the cleaning liquid tank 22, the filters 33, 63 and 65 are totally immersed in the cleaning liquid 40 for cleaning may also be applicable. Further, it is also possible to make a movement of the filters 33, 63 and 65 intermittent, or an occasional reverse rotation or a reverse rotational movement.

Additionally, though the description is given such that the main body of exhaust cleaning system 15 is assembled in the kitchen system 1, in addition to cleaning the exhaust air 5 generated during cooking, any kind of exhaust air can be an object of cleaning. For example, when an exhaust air generated during waste treatment, an exhaust air generated during crushing and grinding and an exhaust air generated by a kiln, such as a cement clinker, are to be cleaned, the main body of exhaust cleaning system 15 may directly be assembled inside an exhaust duct or a stack to clean a contaminated exhaust air passing through the exhaust duct or the stack. Additionally, in the case of assembling in grinding facilities and fine dust generated during grinding and contained in an exhaust air is removed but a chemical treatment is not required, water may be used as a cleaning liquid. Further, when an acid gas or a chloric gas is contained, a solution having an action, such as adsorption and neutralization may be used as a cleaning liquid.

Also, when there is no anxiety of contaminants dropping from an outer face of the cleaning liquid tank 2, omitting the collection part 24, the main body of exhaust cleaning system 15 may be provided with a simple composition and a compact size facilitating the production.

Figure 11:
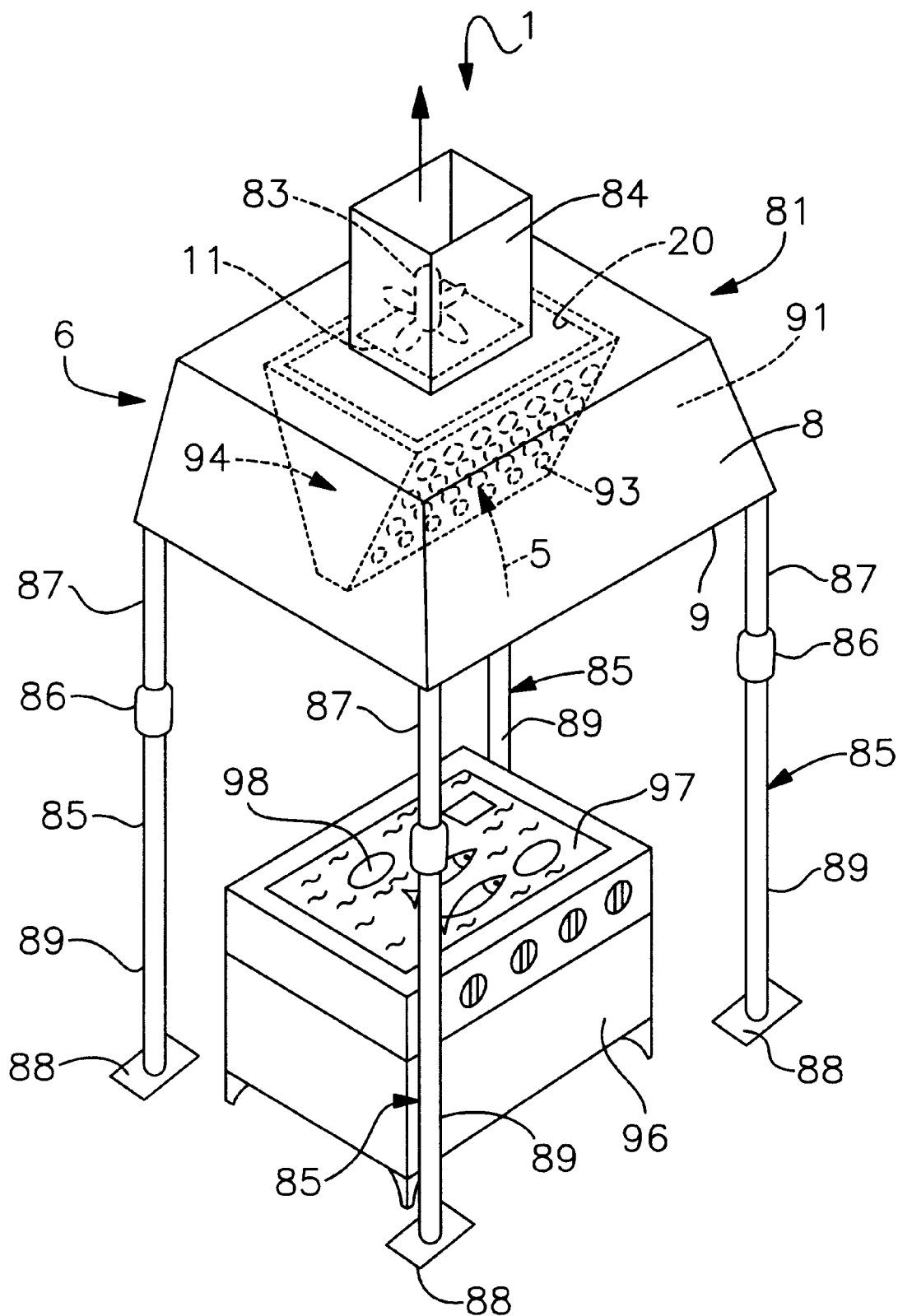
FIG. 11 is a perspective view showing still another embodiment of an exhaust cleaning system of the present invention.
Figure 12:
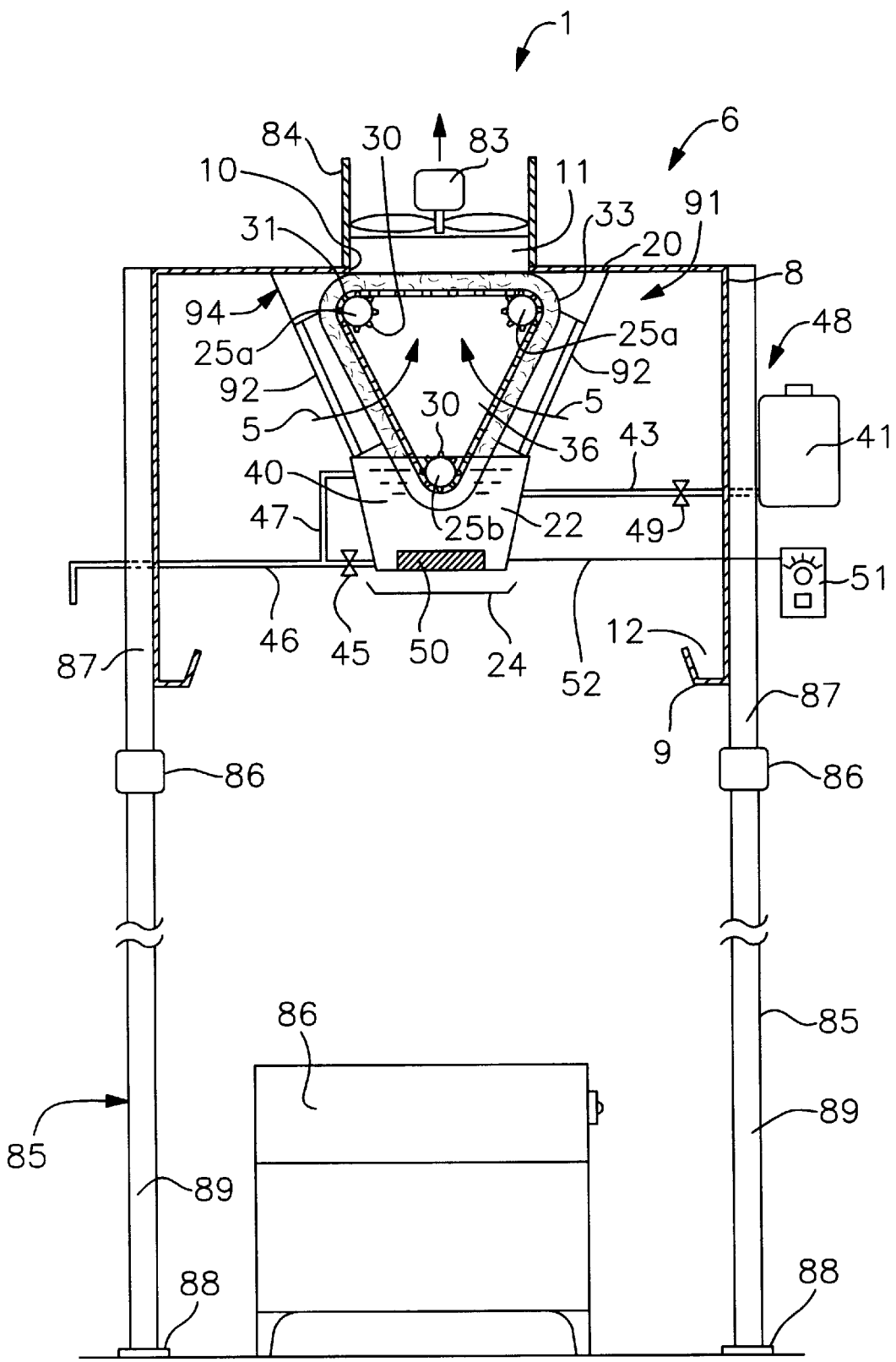
FIG. 12 is a front sectional view of the above.
Figure 13:
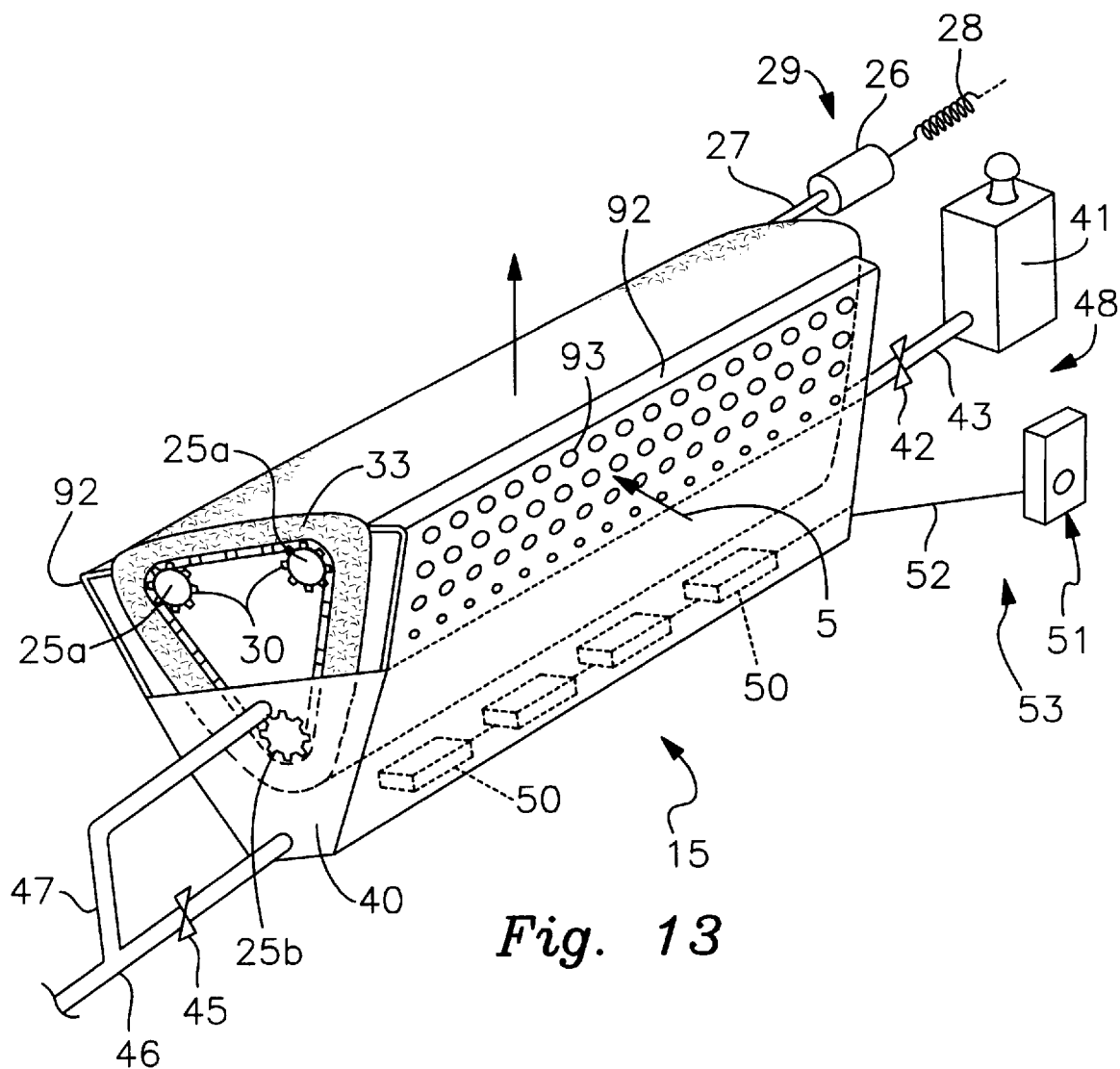
FIG. 13 is a partially cutaway perspective view showing the exhaust cleaning system of the above.

Next, the second embodiment is described by referring to FIG. 11 through FIG. 13.

The second embodiment shown in FIG. 11 through FIG. 13 is a composition in which the exhaust system 6 of the embodiment of FIG. 1 through FIG. 3 is made movable.

That is, in FIG. 11 through FIG. 13, a reference numeral 81 is an exhaust system, and the exhaust system 81 is a near box shape with the inlet opening 9 provided in a lower face and has a hood 82 with the discharge opening 10, to which the fire damper 11 is attached, formed in a near center of an upper face. Also, at the discharge opening 10 of the hood 82, an exhaust duct 84 having a fan 83 is provided to protrude in a stack form.

At lower end corners of the hood 82, nearly bar formed expandable legs 85 having an axial direction along a vertical direction are provided to be mounted/dismounted. The leg 85, of which an upper leg part 87 that is attached to the hood 82 via a joint 86 and a lower leg part 89 having a flat placement part 88 in a flange form at a lower end are connected coaxially, is formed to be expandable, namely a dimension is variable by the joint 86.

Also, in the hood 82, a main body of exhaust cleaning system 91 is attached. The main body of exhaust cleaning system 91 does not have the grease filter 23 in the main body of exhaust cleaning system 15 of the embodiment of FIG. 1 through FIG. 3, and instead it has a main body case 94 as a main body having a plural number of nearly circular inlets 93 formed by punching a side plate 92.

Further, for use, after moving the exhaust system 81 so as the hood 82 to come above a gas fryer 96 to be a combustion system, cooking preparation and cooking are done like the case of the embodiment of FIG. 1 through FIG. 3, namely by igniting the gas fryer 96 and heating a frying oil 97 in the gas fryer 96, fries 98 are cooked. The exhaust air 5 generated by cooking is, like the case of the embodiment of FIG. 1 through FIG. 3, absorbed into the hood 82 by driving the fan 83, flown from the inlet 93 into the main body of exhaust cleaning system 91, and while separating and removing relatively contaminant particles, such as aerial dust, cleaned by flowing through a side face part of the filter 33, the space 36 and an upper face part of the filter 33, flown through the exhaust opening 10 of the fire damper 11 to the exhaust duct 84, and discharged from an upper part of the exhaust duct 84 into the kitchen 7. Additionally, since the cleaning liquid 40 has a deodoring effect, the cleaned exhaust air 5 to be discharged does not smell so much, thereby preventing a degradation in environment of the kitchen 7 due to an offensive odor.

According to the second embodiment shown in FIG. 11 through FIG. 13, since the exhaust system 81 providing the main body of exhaust cleaning system 91 with legs 85 attached to the hood 82 is movable, it can be moved properly to cope with a working condition, namely a generation of the exhaust air 5 of a combustion system such as the gas fryer 96, and thereby the exhaust air 5 can be cleaned efficiently. Further, where multiple combustion systems 4 are provided but cooking is done in one place, the hood 82 may be moved to come above the combustion system 4, and since there is no need to provide exhaust systems 6 for each of these combustion systems 4, a cost of the kitchen 1 can be reduced.

Also, as the leg 85 is formed expandable, a height can be adjusted according to a condition of the generated exhaust air 5 of the combustion system 4, the gas fryer 96 and the like, the exhaust air 5 can be cleaned efficiently, and maintenance operations of the hood 82 and the main body of exhaust cleaning system 91 can be made easy.

Further, since the leg 85 is attached to the hood 82 to be freely mounted/dismounted, a volume is small when the leg 85 is not attached, a space for storage and transportation after production can be saved, disassembling and housing is easily made when not in use, and a maintenance of the main body of the exhaust cleaning system 91 and the like can easily be made.

Additionally about the embodiment shown in FIG. 11 through FIG. 13, though the description is given based on a construction in which the placement part 88 is provided at a lower part of the leg 82 and which is placed on a floor surface, a wheel having a stopper may be provided instead of the placement part 88. According to this composition, the exhaust system 81 can smoothly be moved and a movability is improved.

Also, an incombustible or noncombustible sheet may be hanged at a lower edge of the hood 82. According to this composition, the exhaust air 5 can be cleaned almost completely by the main body of exhaust cleaning system 91, preventing a degradation in a kitchen environment, and it is possible to prevent contaminants remaining in the exhaust air 5 from depositing in areas of the kitchen 7. Additionally, to make possible a confirmation of an internal condition, this sheet is desirably transmissive with regard to light.

Further, though the leg 85 is attached to the hood 82 in the description, when a composition for absorption by the hood 82 is not necessary because of a condition of the exhaust air 5, the leg 85 may directly be attached to the main body case 94 of the main body of exhaust cleaning system 91.

Figure 14:
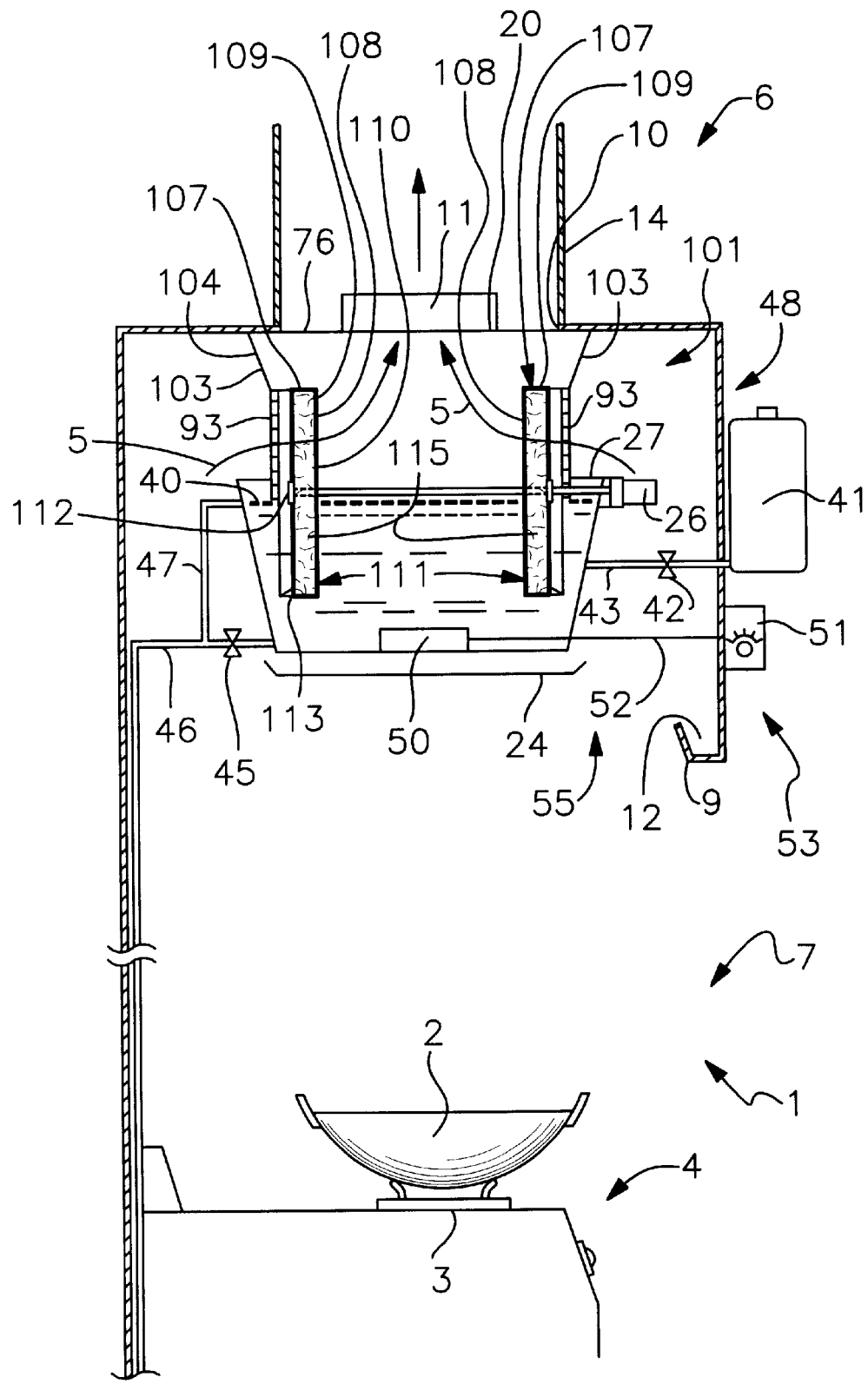
FIG. 14 is a front sectional view showing still another embodiment of an exhaust cleaning system of the present invention.
Figure 15:
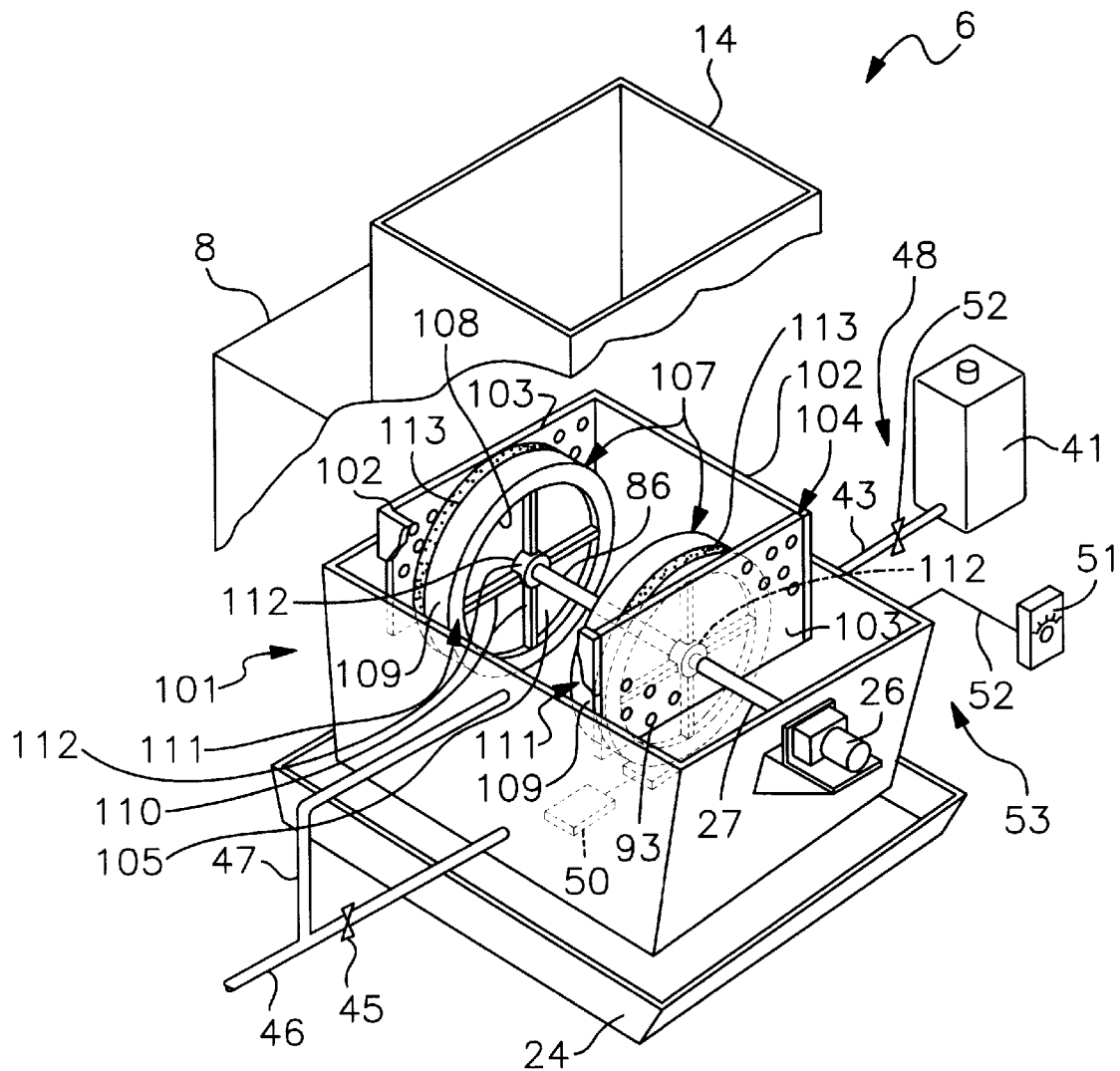
FIG. 15 is a partially cutaway perspective view of the above.

Next, still the third embodiment of the present invention is explained by referring to FIGS. 14 and 15.

In the third embodiment shown in FIGS. 14 and 15, the filter 33 of the embodiment of FIG. 1 through FIG. 3 is formed in a disc shape.

That is, a main body of exhaust cleaning system 101 is made of the materials used for the main body case 18 of the main body of exhaust cleaning system 15 of the embodiment of FIG. 1 through FIG. 3, and has a box-shaped main body case 104 as a main body opened at top and bottom with a pair of nearly rectangular end plates 102, 102 and a pair of nearly rectangular stainless steel side places provided at side edges of the end plates 102, 102. Additionally, at one end plate 102, a similar inspection hole is provided, and like the embodiment of FIG. 11 through FIG. 13, side plates 103, 103 are provided with a plural number of punched nearly circular inlets 93 that are positioned to form nearly semi-circular shapes.

At a lower part of the main body case 104, likewise the cleaning liquid supply/discharge means 48, the collection part 24 and the box-shaped cleaning liquid tank 22, of which an upper face where the trembler 50 of the ultrasonic cleaning means 53 is provided is opened, are provided monolithically.

Also at the side plate 103 of the main body case 104 as a main body, a rotary shaft 106 having an axial direction in opposite directions is arranged with both ends held by bearings, not shown in the drawing, provided at the side plates 103, 103. The rotary shaft 106 of which one end protrudes from the side plate 103 and an end part is connected with the motor 26 arranged on the outer face side of the side plate 103 so as to be rotated. Further, at both ends of the rotary shaft 106, a pair of filter bodies 107 are provided.

Further, the filter body 107 has an outer periphery 109 having windows 108 opened in ring-shaped both end faces, and a filter holding part 111 formed in a circular frame shape with reinforcing members 110, 110 bridging both edges along a diameter direction. Also, at a center part to be a center of the intersecting reinforcing members 110, 110 of the filter holding part 111, a metal member 112 with which the rotary shaft 106 is engaged is provided. Further, on one face side of the outer periphery 109, an elastic member 113, such as a rubber part, protruding in a ring form in an axial direction is provided. Also, in the filter holding part 111, between reinforcing members 110, likewise a nearly disc-shaped filter 115 made of metal wires, such as stainless steel wires, and gathered in a mat form is held from the window 108, and thus the filter body 107 is formed.

Further, the filter body 107 is arranged in the main body case 104 so as to be rotated by the motor 26 with a center of the filter body 107 as a rotation center, by an arrangement such that an end of the rotary shaft 106 is engaged with the metal member 112, and end of the elastic member 113 touches the side plate 103 of the main body case 104, and the inlet 93 is positioned to face an inside of the elastic member 113. By the elastic member 113 touching an inner face of the side plate 103, the exhaust air 5 flowing into the main body case 104 flows through the filter 115 of the filter body 107 by way of an inside closed by the elastic member 113. Further, the filter body 107 is positioned at its lower end in the cleaning liquid tank 22 and is immersed in the cleaning liquid 40.

Also, the main body case 104 is at its upper end attached to an upper lower face, by covering the discharge opening 10, and with the exhaust outlet 20 of an upper face of the main body case 104 connected airtight to the discharge opening 10, and the main body of exhaust cleaning system 101 is provided in the hood 8. Further, the exhaust air 5, flowing from the inlet 93 through the filter 115 of the filter body 107, flows through the exhaust duct 14 from the exhaust opening 10 where the fire damper 11 is provided, and is discharged outdoors.

Additionally, a spacing between a pair of filter bodies 107, 107 being opposed to each other and a dimension of a diameter of the filter body 107 are desirably more than a length in the same direction of the discharge opening 10. That is, if the spacing between the filter bodies 107, 107 is narrow, a wind velocity of the exhaust air 5 is accelerated between the filter bodies 107, 107 and the discharge opening 10 compared with that while passing through the filter 115 and is sowed down again the exhaust duct 14, and thereby an air sound maybe generated or the exhaust air 5 may not efficiently be absorbed due to an increase in an absorption resistance of the exhaust air 5, consequently degrading a cleaning efficiency. Therefore, desirably the spacing between the opposing filter bodies 107, 107 and the dimension of the diameter of the filter body 107 are desirably more than prescribed values.

According to the embodiment of FIGS. 14 and 15, since the filter body 107 having the filter 115 is nearly formed as a disc that occupies a small volume only, a space in the main body case 104 can be formed small and a compact design is easily applicable.

Further, since the nearly disc shaped filter 107 is rotated, no other space is necessary for movement, and thus a compact design is easily applicable.

Also, since a pair of nearly disc shaped filter bodies 107, 107 can be rotated by one rotary shaft 106, the filter bodies 107, 107 can easily be moved with a simple composition, a simplification and compacting of the main body of the exhaust cleaning system 101 can be made easily, and productivity can also be improved.

Further, since mat-shaped filter 115 is held by the filter holding part 111 and is formed in a near disc shape, the filter 115 is free from loosening and can be rotationally moved easily and surely.

Also, since the elastic member 113 for passing the exhaust air 5 to the filter 115 is provided at the filter holding part 111, it is possible to flow the exhaust air 5 easily and surely to the filter 115, without causing leakage, and the exhaust air 5 can be cleaned efficiently.

Additionally, in above-mentioned embodiment of FIGS. 14 and 15, a pair of opposing filter bodies 107, 107 are borne by one rotary shaft 106, but the filter bodies 107, 107 can also be held in intersecting axial directions, namely so as opposing faces expand upward, to freely rotate.

Also, the filter body 107 can also be arranged with one piece instead of two pieces, as shown in FIGS. 9 and 10, and further, it may be arranged with plural pieces so as they are superposed or radially oppose. Additionally, when only one piece is provided, a space to arrange the filter body 107 can be saved, and thereby a compact, lightweight system for home use can be provided, and productivity can also be improved. Also, when plural pieces are superposed, the exhaust air 5 passes through the filter 115 more than once, and a cleaning performance of the exhaust air can be improved.

Further, it is also possible to provide the elastic member 113 provided at the filter body 107 and a roller at the side plate 103 so as their ends adhere to the filter body 107.

Figure 16:
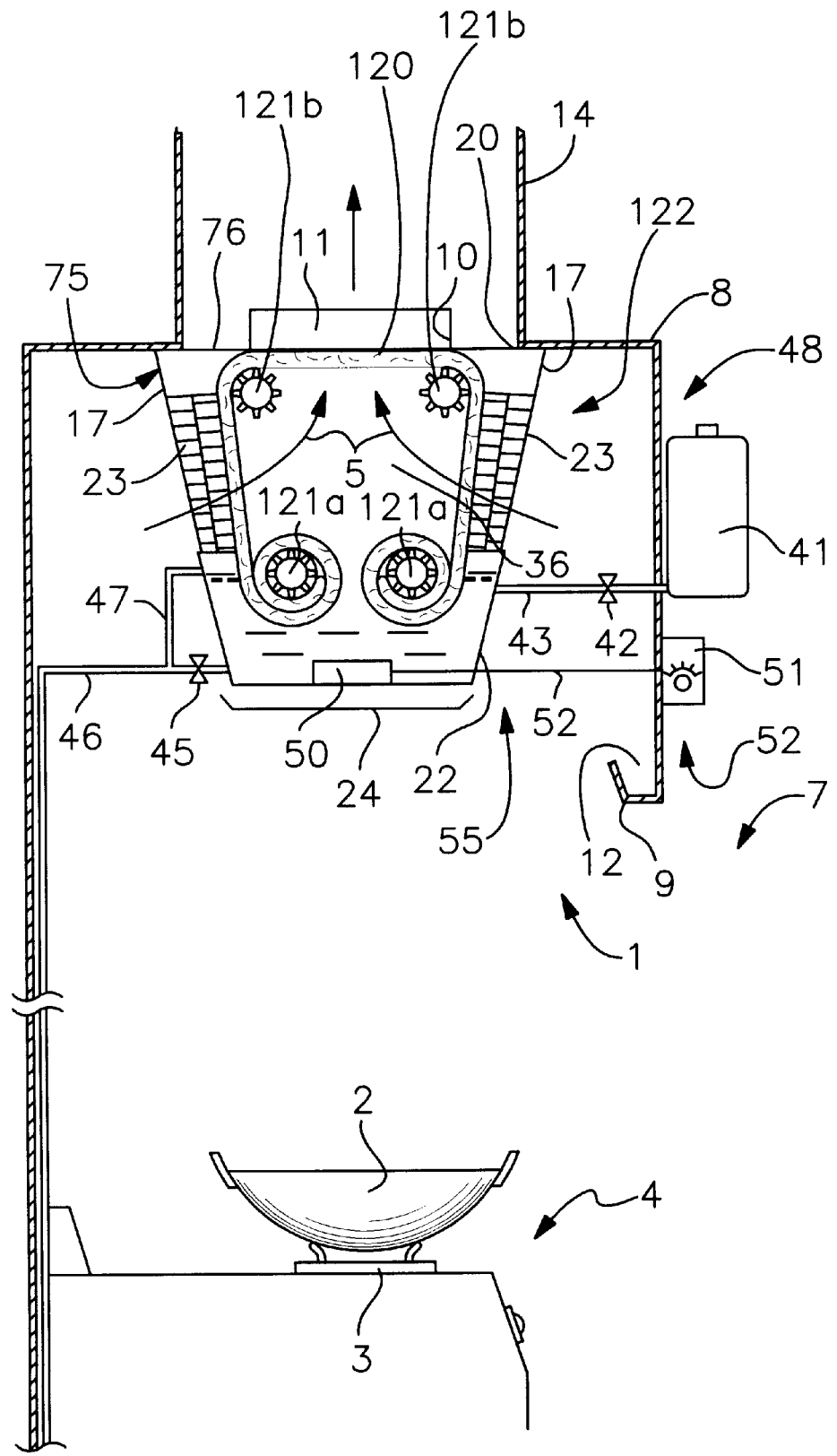
FIG. 16 is a front sectional view showing still another embodiment of an exhaust cleaning system of the present invention.

Next, still forth embodiment of the exhaust cleaning system according to the present invention is described by referring to FIG. 16.

In the forth embodiment shown in FIG. 16, a filter 120, namely the endless-belt-formed filter 33 of the embodiment of FIG. 1 through FIG. 3 is formed as a band. That is, like the filter 33 of the embodiment of FIG. 1 through FIG. 3, the filter 120 having a flexibility is formed as a band by gathering metal wires, and both ends of the filter 120 in a length direction are positioned in the cleaning liquid tank 22 and fixed to rotary shafts 121a, 121a that are provided to freely rotate, and the filter 120 is spanned to rotary shafts 121b, 121b located upward so as to fully cover the discharge opening 10, so that the filter 120 performs a parallel movement, namely the filter 120 is wound up as a shutter when one rotary shaft 121a rotates and a portion wound up by the other rotary shaft 121a is unwound.

According the a composition of a main body of exhaust cleaning system 122 shown in FIG. 16, it is possible to pass the exhaust air 5 more than once even if the filter 120 is not formed in a tubular shape, so that a compact design is easily applicable.

Also, since the filter 120 has ends, it can easily be spanned to the rotary shafts 121a, 121b without causing a sag and can easily be mounted/dismounted, and a maintainability can be improved.

Figure 17:
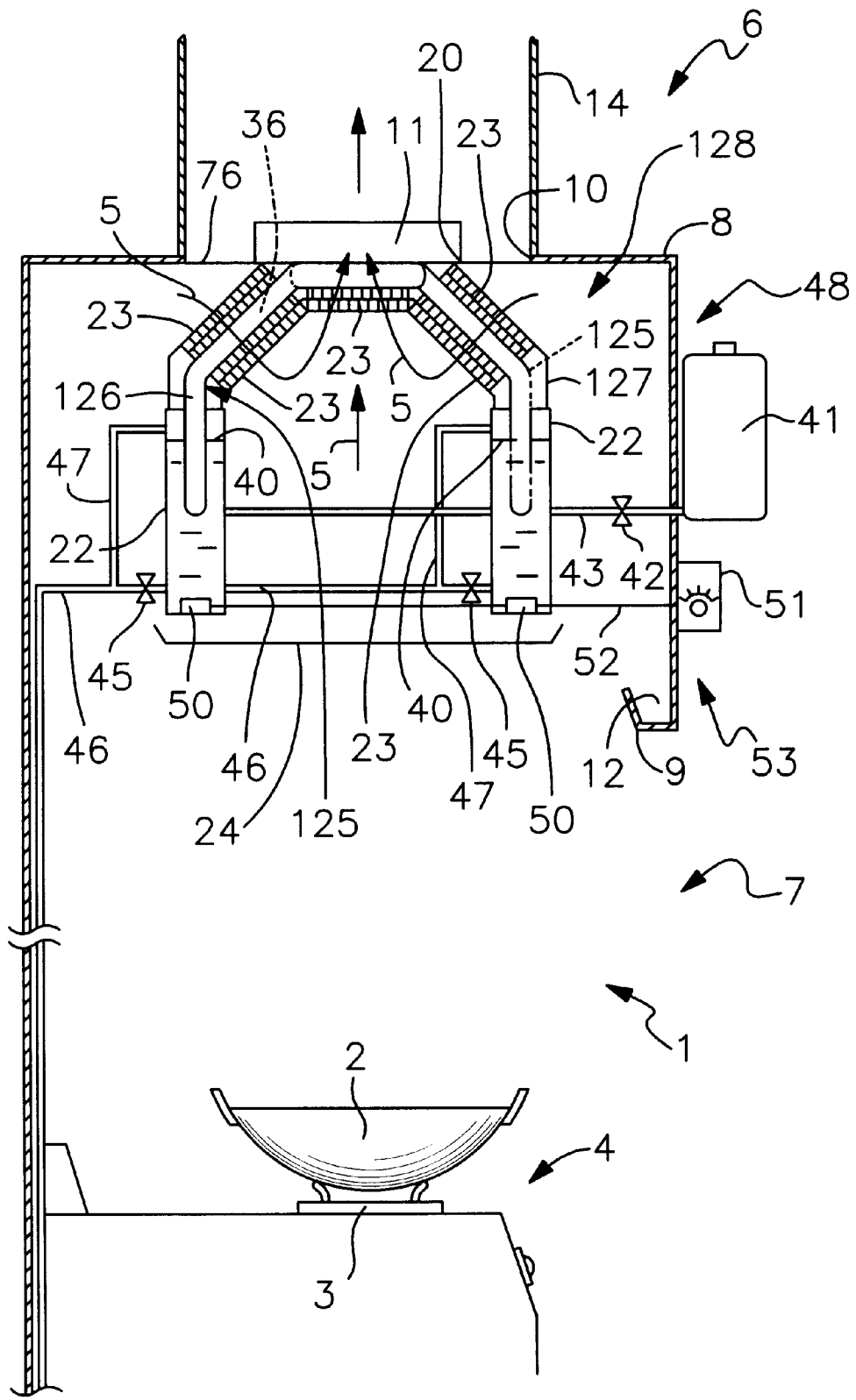
FIG. 17 is a front sectional view showing still another embodiment of an exhaust cleaning system of the present invention.
Figure 18:
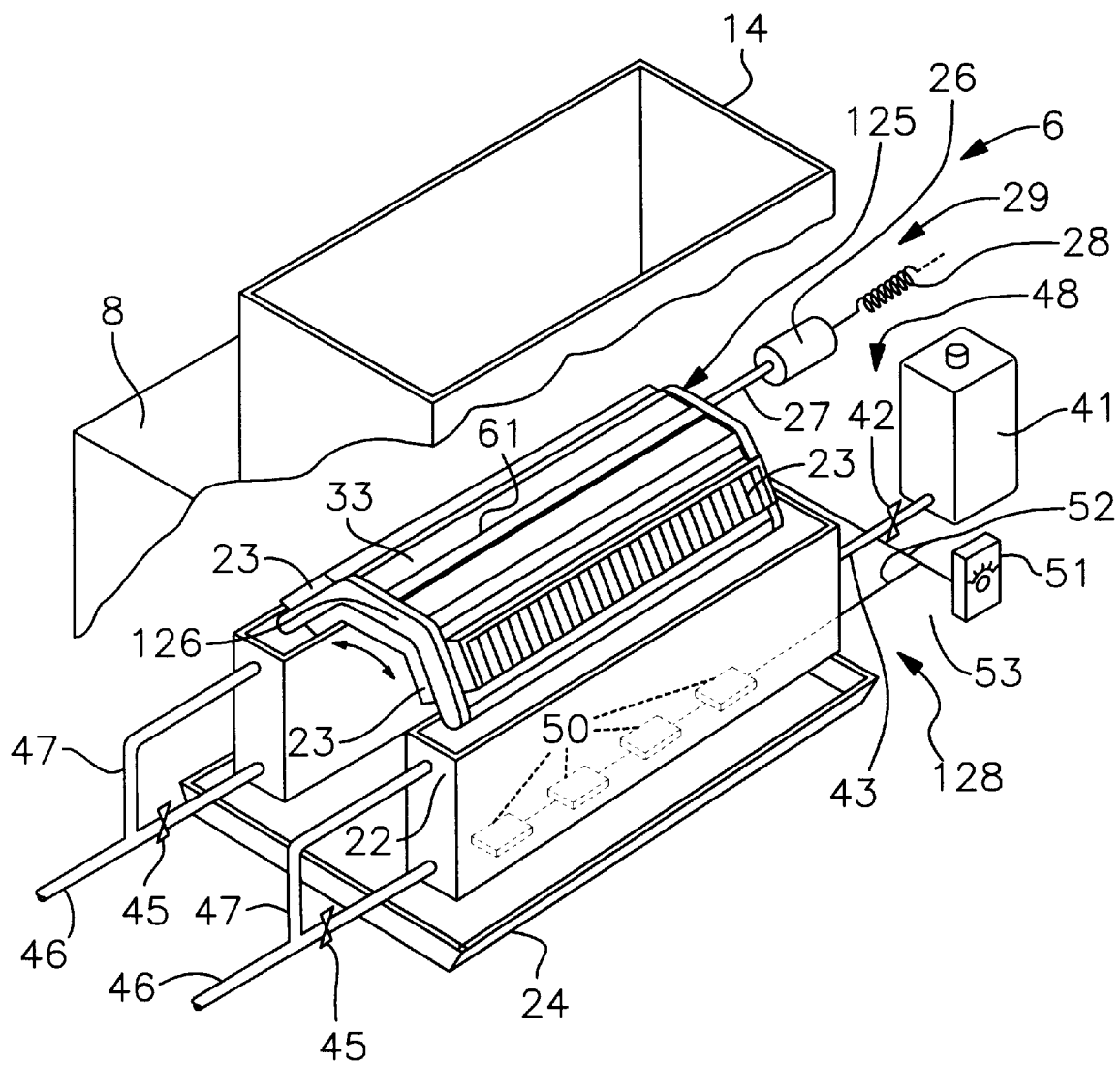
FIG. 18 is a partially cutaway perspective view of the above.

Additionally, the filter 120 is formed as a windable belt shape like a shutter in the embodiment of FIG. 16, but as shown in FIGS. 17 and 18, it is also possible, for example, to form a filter body 125 monolithically and the filter body 125 may be moved in parallel.

That is, the nearly tubular filter body 67 of the embodiment shown in FIGS. 5 and 6, and the endless-belt shaped filter 33 is held in a tilted condition by the filter holding part 126 so as both ends in axial directions extend in the same direction, thereby forming the filter body 125 as a monolithic structure. Then, so as the filter body 125 of its tilted parts on both sides extend downward, a main body case 127 as a main body is arranged inside and is moved in parallel toward the tilted parts, so that a main body of exhaust cleaning system 128 that can immerse and clean the filter body in the cleaning liquid 40 with the discharge opening 10 closed may be formed.

Figure 19:
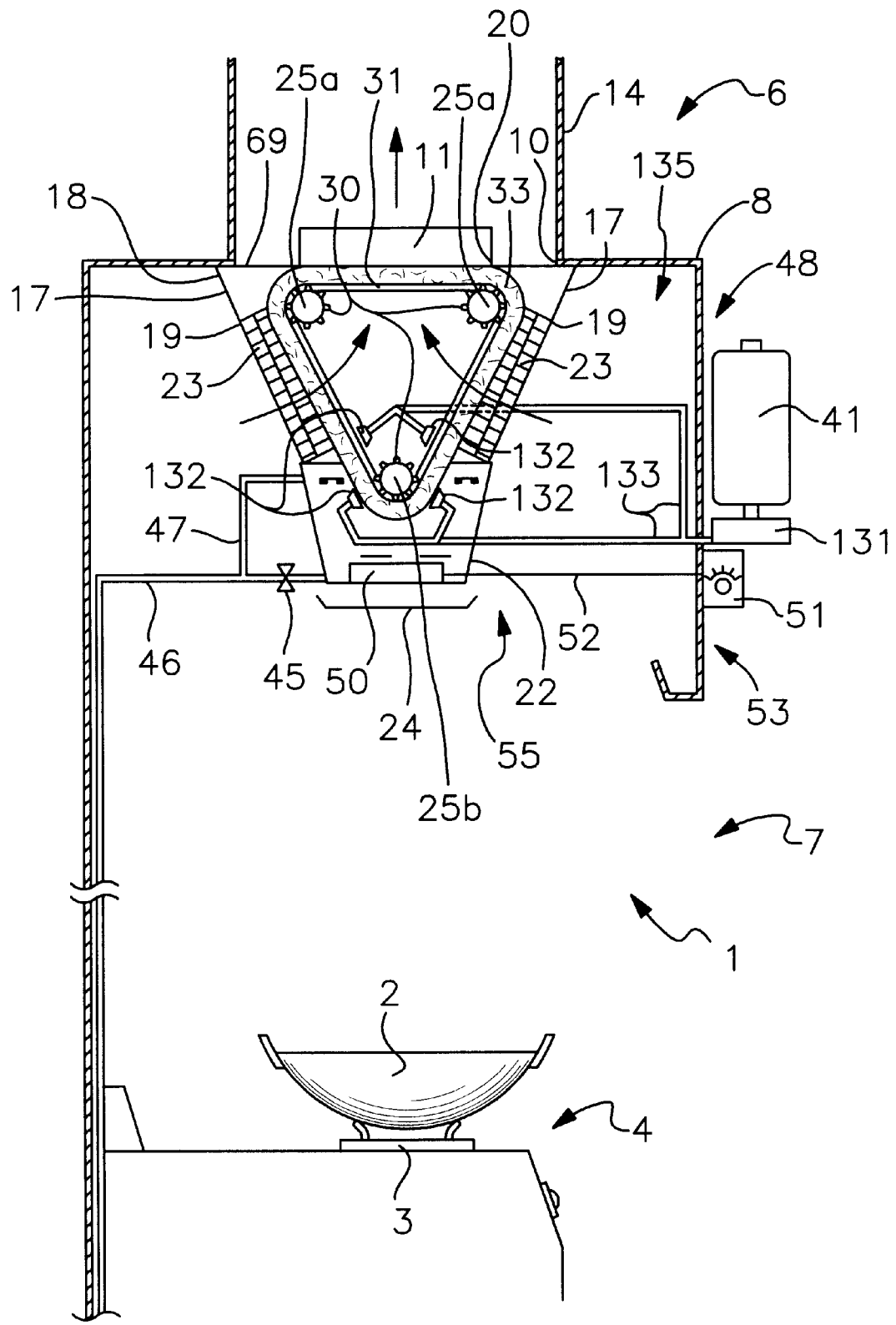
FIG. 19 is a front sectional view showing still another embodiment of an exhaust cleaning system of the present invention.
Figure 20:
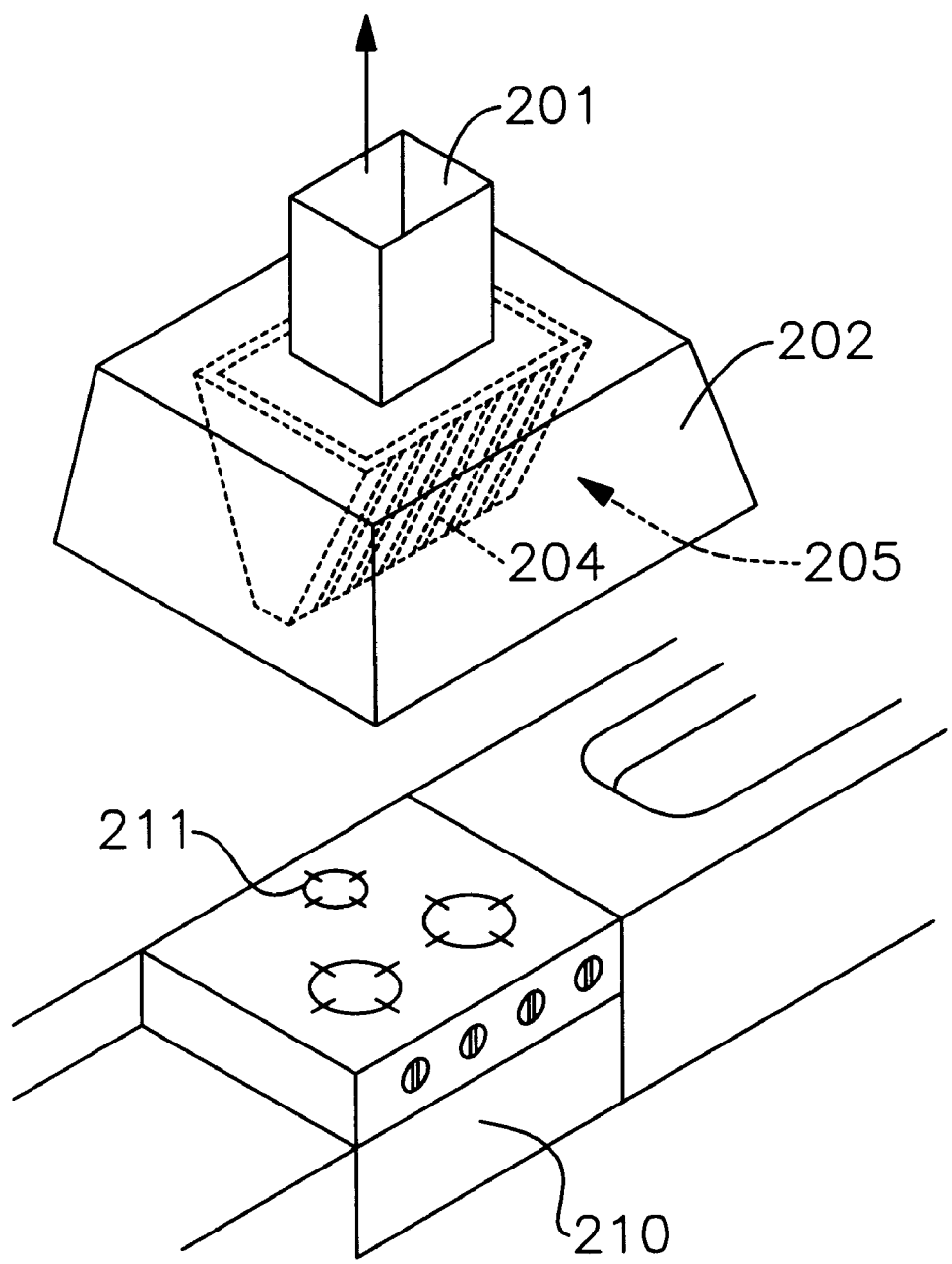
FIG. 20 is a perspective view showing a conventional exhaust cleaning system.
Figure 21:
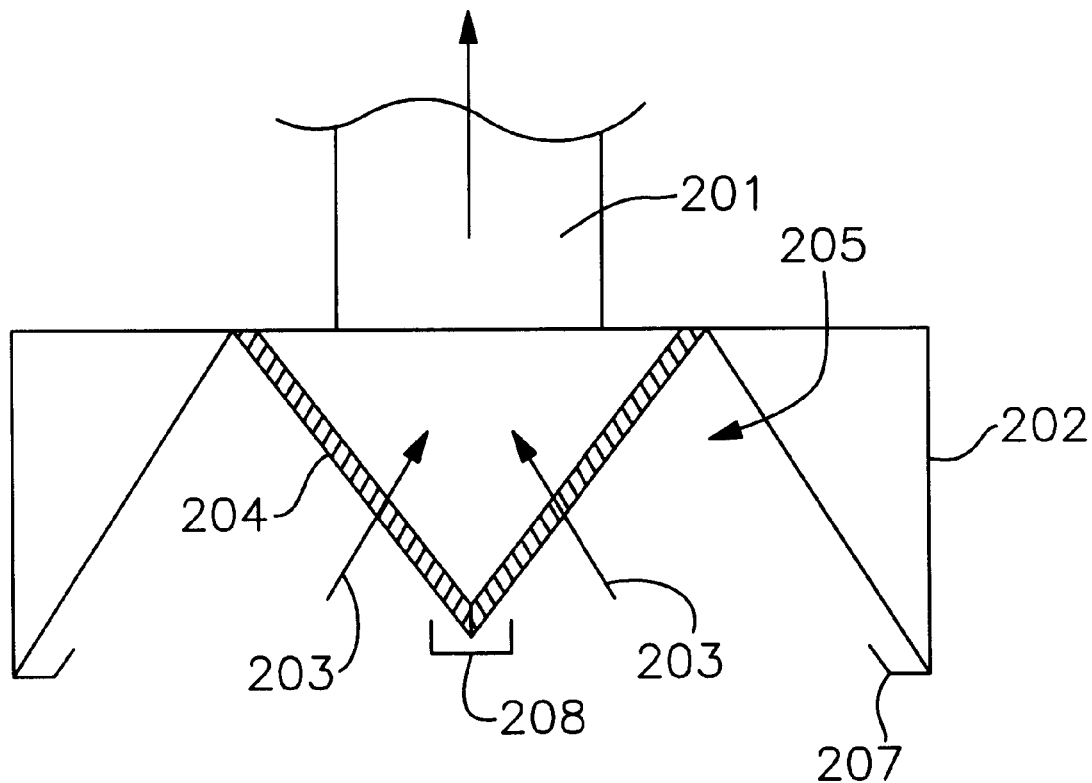
FIG. 21 is a front sectional view of the above.
Figure 22:
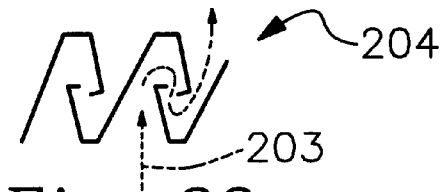
FIG. 22 is a sectional view showing a louver structure of a grease filter of the above.
Figure 23:
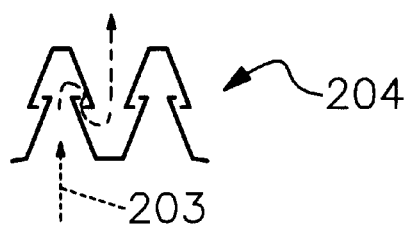
FIG. 23 is a sectional view showing a louver structure of a grease filter of another conventional exhaust cleaning system.
Figure 24:
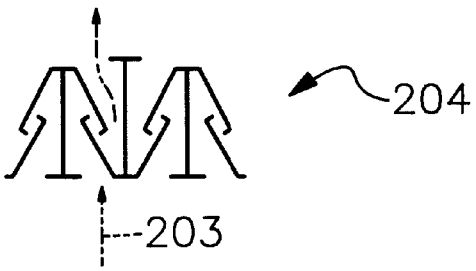
FIG. 24 is a sectional view showing a louver structure of a grease filter of still another conventional exhaust cleaning system.
Figure 25:
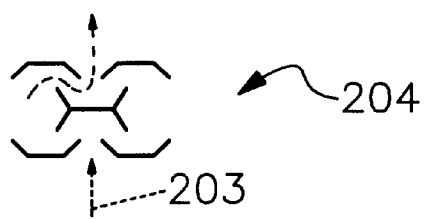
FIG. 25 is a sectional view showing a louver structure of a grease filter of still another conventional exhaust cleaning system.

Next, still forth embodiment of the present invention is described by referring to FIG. 19.

In the fifth embodiment shown in FIG. 19 is a composition in which, instead of a process to immerse and clean the filter 33 in the cleaning liquid 40 in the cleaning liquid tank 22 of the embodiment shown in FIG. 1 through FIG. 3, the filter 33 is cleaned by contact with the cleaning liquid 40, namely by injection.

That is, an injection means 131, such as a pump for pressure-feeding the cleaning liquid 40 is connected to the tank 41 storing the cleaning liquid 40, and an injection tube 133 having a nozzle 132, as an injection part, is attached at a top of the injection means 131. Then, arranging the nozzle 132 so as to face the filter 33, caught contaminants are cleaned and separated by injecting the cleaning liquid 40 to the filter 33.

Here, a cleaned effluent is collected into the cleaning liquid tank 22 and circulated again to the injection means 131.

According to the composition of the main body of exhaust cleaning system 135 shown in FIG. 19, there is no anxiety of noise due to ultrasonic cleaning being generated.

Also, since the nozzle 132 is arranged in the cleaning liquid tank 22 and the injected cleaning liquid 40 is collected by the cleaning liquid tank 22 located downward, it is easily possible to collect the exhaust liquid 40 while cleaning the exhaust air 5 with a simple composition.

Additionally, even when the cleaning liquid 40 is injected in a mist form from the nozzle 132, the cleaning liquid 40 is collected by the filter 33 at its part adhering to the discharge opening 10 and is not absorbed into the exhaust duct 14, so that a soil in the exhaust duct 14 can be prevented. Further, by positioning the nozzle 132 so as to be immersed in the cleaning liquid 40 stored in the cleaning liquid tank 22, the injected cleaning liquid 40 does not form a mist and does not soil peripheral areas.

Also, since the cleaning liquid 40 is injected from an upstream side in a direction along which the exhaust air 5 flows, namely on a front side of the filter 33, even if the cleaning liquid 40 flies in a mist form, it is scarcely caught by and flows through the filter 33, so that other parts are not soiled, a collection of the cleaning liquid 40 is easy, and an arrangement of the nozzle 132 and an assembling of the filter 33 can easily be made.

Further, since the cleaning liquid 40 is injected, a kinetic energy of injection also adds a physical cleaning power.

Additionally, though the cleaning liquid 40 is injected in the description, it may be flown down from an upper part so as to contact the filter 33.

Also, for example, the nozzle 132 as an injection part may be formed as a tube-shaped injection part having a length direction along a direction horizontal to a plain of the filter 33 and an injection outlet for injecting the cleaning liquid 40 to a face opposing the filter 33, where the tube-shaped injection part is at both ends held by a rail to move along a plain of the filter 33, so that the cleaning liquid 40 is supplied to the injection part and the filter 33 is cleaned by the moving injection part.

INDUSTRIAL APPLICABILITY

As described above, the present invention can be used for the exhaust cleaning system which are clarified and discharged an exhaust air containing oily steam and dust generated from the kitchens used at food supply facilities of hotels, restaurants, Tempura restaurants and Yakitori restaurant and home ventilation fans, and exhaust air containing contaminants generated from incineration facilities at waste incineration plants, crushing facilities of quarries and a clinker calcination facilities of cement plants. According to the present invention, since an exhaust air flowing from an inlet into a main body is flown through a permeable filter moving inside the main body and is discharged from an exhaust outlet of the main body, contaminants in the exhaust air are caught, separated and removed, and the caught contaminants are washed off by a cleaning means while changing a position of the filter moved by a moving means, cleaning operations can be nearly automated, the exhaust air can be cleaned efficiently.

What is claimed is:

1. An exhaust clean system characterized by provision for;
    a main body having an exhaust inlet into which an exhaust air flows and an exhaust outlet from which said exhaust air is discharged;
    a permeable filter, provided in the main body, for passing said exhaust air that flows in from said exhaust inlet and discharging the same from said exhaust outlet;
    a cleaning means for cleaning at least a part of the filter by an incombustible and vegetable cleaning liquid; and
    a moving means for moving said filter to change a cleaning position of said filter to be cleaned by said cleaning means.

2. An exhaust cleaning system characterized by comprising a main body having an exhaust inlet into which an exhaust air flows and an exhaust outlet from which said exhaust air is discharged;
    a permeable filter, provided in the main body, for passing said exhaust air that flows in from said exhaust inlet and discharging the same from said exhaust outlet;
    a cleaning means for cleaning at least a part of the filter by a cleaning liquid containing a main component of amine soap made from tallol oil as a material and a higher alcoholic nonionic surfactant, and
    a moving means for moving said filter to change a cleaning position of said filter to be cleaned by said cleaning means.

3. An exhaust cleaning system according to claim 1 or 2, wherein said cleaning means is provided with an injection unit for injecting the cleaning liquid at least to a part of the filter.

4. An exhaust cleaning system characterized by provision for;
    a main body having an exhaust inlet into which an exhaust air flows and an exhaust outlet from which said exhaust air is discharged;
    a permeable filter provided in the main body covering said exhaust outlet,
    a cleaning means for storing an incombustible, vegetable cleaning liquid to immerse at least a part of the filter; and a moving means for moving said filter to change a cleaning position of said filter to be cleaned by said cleaning means.

5. An exhaust cleaning system characterized by provision for;
- a main body having an exhaust inlet into which an exhaust air flows and an exhaust outlet from which said exhaust air is discharged;
- a permeable filter provided in the main body covering said exhaust outlet,
- a cleaning means for storing a cleaning liquid containing a main component of amine soap made from tallol oil as a material and a higher alcoholic nonionic surfactant to immerse at least a part of the filter, and
- a moving means for moving said filter to change a cleaning position of said filter to be cleaned by said cleaning means.

6. An exhaust cleaning system according to any a one of claims 1, 2, 4, or 5, wherein said moving means moves the filter in the condition of covering the exhaust outlet.

7. An exhaust cleaning system according to any one of claims 1, 2, 4, or 5, wherein said exhaust air passes through the filter at least twice.

8. An exhaust cleaning system according to any one of claims 1, 2, 4, or 5, wherein said filter is formed as an endless belt.

9. An exhaust cleaning system according to any one of claims 1, 2, 4, or 5, wherein said filter is formed in a nearly tubular shape having a space inside.

10. An exhaust cleaning system according to any one of claims 1, 2, 4, or 5, wherein said moving means has a filter holding part for holding the filter and a driving means for moving the filter holding part.

11. An exhaust cleaning system according to any one of claims 1, 2, 4, or 5, wherein said moving means rotationally moves the filter.

12. An exhaust cleaning system according to any one of claims 1, 2, 4, or 5, wherein said moving means is provided with a frame-like filter holding part for holding the filter and a driving means for moving rotationally the filter holding part.

13. An exhaust cleaning system according to any one of claims 1 and 3 inclusive, 2 and 3 inclusive, 4, or 5, wherein said cleaning means is provided with an ultrasonic cleaning means for ultrasonically cleaning the filter immersed in the cleaning liquid.

14. An exhaust cleaning system characterized by provision for;
- a main body having an exhaust inlet into which an exhaust air flows and an exhaust outlet from which said exhaust air is discharged;
- a permeable filter, provided in the main body, for passing said exhaust air that flows in from said exhaust inlet and discharging the same from said exhaust outlet;
- a cleaning means having an injection unit for cleaning said filters by injecting an incombustible, vegetable cleaning liquid at least to a part of the filters; and
- a moving means for moving said injection unit of said cleaning means to change a cleaning position of said filter to be cleaned by said cleaning means.

15. An exhaust cleaning system characterized by provision for;
- a main body having an exhaust inlet into which an exhaust air flows and an exhaust outlet from which said exhaust air is discharged;
- a permeable filter provided in the main body, for passing said exhaust air that flows in from said exhaust inlet and discharging the same from said exhaust outlet;
- a cleaning means having a injection unit for cleaning said filter by injecting at least to a part of the filter a cleaning liquid containing a main component of amine soap made from tallol oil as a material and a higher alcoholic nonionic surfactant, and
- a moving means for moving said injection unit of said cleaning means to change a cleaning position of said filter to be cleaned by said cleaning means.

16. An exhaust cleaning system according to any one of claims 1 and 3 inclusive, 2 and 3 inclusive, 14 or 15 and characterized by an injection unit for injecting a cleaning liquid from the upper side of flowing direction of the exhaust air to the filter.

17. An exhaust cleaning system according to any one of claims 2, 5, or 15, wherein said cleaning liquid is incombustible, and vegetable.

18. An exhaust cleaning system according to any one of claims 1, or 2, or 1 and 3 inclusive, or 2 and 3 inclusive, or 4, or 5, or 1, 3 and 13 inclusive, or 2, 3 and 13 inclusive, or 14, or 1, 3 and 16 inclusive, or 2, 3 and 16 inclusive, or 14 and 16 inclusive, or 15 and 16 inclusive, wherein said cleaning liquid contains a main component of amine soap made from tallol oil as a material and a higher alcoholic nonionic surfactant.

19. An exhaust cleaning system according to any one of claims 1, 2, 4, 5, 14, or 15, wherein said filter has flame retardant, or incombustible, and anticorrosive properties.

20. An exhaust cleaning system according to any one of claims 1, or 2, or 4, or 5, or 14, or 15, or 1 and 19 inclusive, or 2 and 19 inclusive, or 4 and 19 inclusive, or 5 and 19 inclusive, or 14 and 19 inclusive, or 15 and 19 inclusive, wherein said filter is formed with at least either of gathered slender metal wires and gathered slender metal thin sheets.

21. An exhaust cleaning system according to any one of claims 1, or 2, or 4, or 5, or 14, or 15, or 1 and 19 inclusive, or 2 and 19 inclusive, or 4 and 19 inclusive, or 5 and 19 inclusive, or 14 and 19 inclusive, or 15 and 19 inclusive, or 1, 19 and 20 inclusive, or 2, 19 and 20 inclusive, or 11, 19 and 20 inclusive, or 5, 19 and 20 inclusive, or 14, 19 and 20 inclusive, or 15, 19 and 20 inclusive, wherein said filter is formed with stainless steel.

22. An exhaust cleaning system according to any one of claims 1, 2, 4, 5, 14 or 15, wherein said main body has a leg part that mounts the main body to move on a floor surface.

23. An exhaust cleaning system according to any one of claims 1, 2, 4, 5, 14 or 15, wherein said cleaning means is provided with a cleaning liquid supply/discharge means for supplying and discharging a cleaning liquid.

24. An exhaust cleaning system according to any one of claims 1, 2, 4, 5, 14 or 15, wherein said filter is covered with a flow restricting body having flow holes that do not allow linearly flow of exhaust air.

25. An exhaust cleaning system according to any one of claims 1, 2, 4, 5, 14 or 15, wherein said cleaning means has a receiving tank, with plane area equal to or exceeding that of the filter and arranged underneath said filter.

26. An exhaust cleaning system according to any one of claims 1, 2, 4, 5, 14 or 15, wherein said main body is equipped with a fire detection means for detecting fire and a shutter body for closing the exhaust outlet.

* * * * *

UNITED STATES PATENT AND TRADEMARK OFFICE
CERTIFICATE OF CORRECTION

PATENT NO.     : 6,162,286                              Page 1 of 1
DATED          : December 19, 2000
INVENTOR(S)    : Norito Hasama et al.

It is certified that error appears in the above-identified patent and that said Letters Patent is hereby corrected as shown below:

Title page,
Item [75], Inventors, replace "both of Hanno, Japan" with -- both of Saitama, Japan --.

Column 10,
Line 62, replace "in FIG. 1" with -- In FIG. 1 --.

Column 28,
Line 42, replace "11" with -- 4 --.

Signed and Sealed this

Twentieth Day of November, 2001

*Attest:*

*Attesting Officer*

NICHOLAS P. GODICI
*Acting Director of the United States Patent and Trademark Office*